US005724437A

United States Patent [19]

Bucher et al.

[11] Patent Number: 5,724,437

[45] Date of Patent: Mar. 3, 1998

[54] DEVICE FOR PARALLEL IMAGE INSPECTION AND INKING CONTROL ON A PRINTED PRODUCT

[75] Inventors: Harald Bucher, Eschelbronn; Gerhard Fischer, Sinsheim; Wolfgang Geissler, Bad Schoenborn; Werner Huber, Rauenberg; Helmut Kipphan, Schwetzingen; Bernd Kistler, Eppingen; Gerhard Loeffler, Walldorf; Clemens Rensch, Heidelberg, all of Germany

[73] Assignee: Heidelberger Druckmaschinen AG, Heidelberg, Germany

[21] Appl. No.: 571,857

[22] PCT Filed: Jun. 22, 1994

[86] PCT No.: PCT/EP94/02033

§ 371 Date: Apr. 15, 1996

§ 102(e) Date: Apr. 15, 1996

[87] PCT Pub. No.: WO95/00335

PCT Pub. Date: Jan. 5, 1995

[30] Foreign Application Priority Data

Jun. 25, 1993 [DE] Germany .......................... 43 21 177.1

[51] Int. Cl.$^{6}$ .......................................... G06K 9/00

[52] U.S. Cl. ............... 382/112; 250/227.11; 250/559.01

[58] Field of Search .............................. 382/112, 321; 358/515, 509, 511, 512; 250/227.26, 559.01, 227.11

[56] References Cited

U.S. PATENT DOCUMENTS

| | | | |
|---|---|---|---|
| 3,660,594 | 5/1972 | Marsh | 358/511 |
| 4,197,584 | 4/1980 | Blazek | 364/551.01 |
| 4,426,074 | 1/1984 | Fischer | 271/302 |
| 4,439,038 | 3/1984 | Mactaggert | 356/408 |
| 4,660,159 | 4/1987 | Ott | 364/526 |
| 4,685,139 | 8/1987 | Masuda et al. | 382/112 |
| 4,748,680 | 5/1988 | Margolin | 382/162 |
| 4,827,526 | 5/1989 | Matsumoto | 382/112 |
| 4,963,895 | 10/1990 | Harada et al. | 347/232 |

(List continued on next page.)

FOREIGN PATENT DOCUMENTS

| | | |
|---|---|---|
| 1280218 | 2/1991 | Canada . |
| 0 104 477 | 4/1984 | European Pat. Off. . |
| 0 125 556 | 11/1984 | European Pat. Off. . |

(List continued on next page.)

OTHER PUBLICATIONS

Publ. Applied Optics, vol. 30, No. 32, Nov. 1991, (Simpson et al.), pp.4666–4670, "Imaging colorimetry"...

Xerox Disclosure Journal, vol. 18, No. 2 (Edmunds et al),Mar./Apr. 1993, pp.203–210, "Adaptive exposure "...

Publ. Fogra–Symposium, Apr. 1988 (Kleinmeier), pp.1–14, "Der heutige Stand der Bilderfassung bei der . . .".

Publ. Der Polygraph 11–92 (Zankel), pp.42–43, "Digitalisierte Steuerungen fuer Bogen–und Rollenmaschinen . . . ".

Publ. Deutscher Drucker No.43, 21–11–91, pp.41–43, "Neues fuer den Flexodrucker: Rasterwalzen, Klischees"...

Publ. Feingeraetetechnik No.38, 1989 (Geschke et al.) pp. 10–13, "Digitale Bildverarbeitung zur Kontrolle . . . ".

*Primary Examiner*—Thomas D. Lee
*Assistant Examiner*—Jayanti K. Patel
*Attorney, Agent, or Firm*—Herbert L. Lerner; Laurene A. Greenberg

[57] ABSTRACT

The invention relates to a device for inspecting the image and measuring the color of at least one printed product produced by a printing machine with at least one printing group. The purpose of the present invention is to teach a device permitting the quality and color of printed products to be assessed. To do this, the device consists of at least one imaging device providing the image data of the printed product and a computer device, in which the computer device detects all the image data of the printed products for image inspection and determines a measurement color assessment from the image data of at least one measuring point of the printed product.

26 Claims, 17 Drawing Sheets

U.S. PATENT DOCUMENTS

| | | | |
|---|---|---|---|
| 4,975,862 | 12/1990 | Keller et al. | 364/526 |
| 5,050,994 | 9/1991 | Kipphan et al. | 356/445 |
| 5,142,139 | 8/1992 | Hayashi et al. | 250/208.1 |
| 5,163,012 | 11/1992 | Wuhrl et al. | 364/552 |
| 5,223,918 | 6/1993 | Berthold et al. | 356/407 |
| 5,300,767 | 4/1994 | Steinle et al. | 250/208.1 |
| 5,537,229 | 7/1996 | Brandestini et al. | 358/409 |

FOREIGN PATENT DOCUMENTS

| | | |
|---|---|---|
| 0 143 744 | 6/1985 | European Pat. Off. . |
| 0 095 649 | 8/1987 | European Pat. Off. . |
| 0 324 718 | 7/1989 | European Pat. Off. . |
| 0 332 706 | 9/1989 | European Pat. Off. . |
| 0 392 814 | 10/1990 | European Pat. Off. . |
| 0 410 253 | 1/1991 | European Pat. Off. . |
| 0 327 416 | 1/1993 | European Pat. Off. . |
| 27 28 738 | 1/1979 | Germany . |
| 32 07 369 | 11/1982 | Germany . |
| 30 29 154 | 1/1983 | Germany . |
| 32 48 928 | 7/1983 | Germany . |
| 35 03 204 | 8/1986 | Germany . |
| 26 20 611 | 8/1987 | Germany . |
| 37 08 925 | 11/1987 | Germany . |
| 36 39 636 | 5/1988 | Germany . |
| 38 30 732 | 3/1990 | Germany . |
| 40 23 414 | 2/1991 | Germany . |
| 41 05 456 | 9/1991 | Germany . |
| 41 15 067 | 11/1992 | Germany . |
| 42 19 560 | 12/1992 | Germany . |
| 41 36 461 | 5/1993 | Germany . |
| 56-137247 | 1/1982 | Japan . |
| 9 002 576 | 6/1992 | Netherlands . |
| 2 066 949 | 7/1981 | United Kingdom . |
| 2 107 047 | 4/1983 | United Kingdom . |
| 2 115 145 | 9/1983 | United Kingdom . |
| 2 253 481 | 9/1992 | United Kingdom . |
| 2 261 341 | 5/1993 | United Kingdom . |
| 89/01867 | 3/1989 | WIPO . |
| 89/01867 | 8/1989 | WIPO . |

DEVICE FOR PARALLEL IMAGE INSPECTION AND INKING CONTROL ON A PRINTED PRODUCT

The invention relates to a device for image inspection and colour measurement on at least one printed product produced in a printing press with at least one printing unit.

Known from EP 0 324 718 A1 are a process and a device for the inking control of a printing press. On the basis of the spectral measured values of a colour-control strip, if an actual colour locus deviates from a setpoint colour locus, the required film-thickness changes in the individual ink zones of the individual printing units are calculated through the intermediary of a special computing process (linear model). Since a colorimetric closed-loop control simulates a closed-loop control with regard to the colour sensation received by the human eye from a printed product, it is possible to achieve a high-grade print quality. The colorimetric control process for a printing press described in EP 0 324 718 A1 is to be viewed as an advantageous embodiment of colorimetric closed-loop control and as an integral constituent part of the present patent application.

A device for the implementation of a comprehensive quality control on printed sheets is described in EP 0 410 253 A2. The image data of a printed product are captured by a video camera disposed above a colour-matching table. The data are stored in a memory for digital image data. Provided parallel to the video camera is a light source both for the representation of data and also as a guiding apparatus for the measuring apparatuses. Provided between video camera and light source are one or more systems for image evaluation, particularly for pattern recognition, which use the data of the memory for the image data. In particular, colour-measuring devices and register-measuring devices enter into consideration as measuring apparatuses.

The object of the present invention is to create a device that makes in possible for the quality and colour of printed products to be evaluated simultaneously.

The object of the invention is achieved in that the device consists of at least one image-capturing apparatus, supplying image data (:=position-correlated measured data) from the printed product, and of a computing apparatus, the computing apparatus, on the one hand, determining all image data of the printed product for the purpose of image inspection and, on the other hand, determining from the image data of at least one measuring point (pixel) of the printed product a measured variable for a colour assessment. The image data for image inspection and colour assessment may come either from one or also from various printed products.

Proposed for the first time herewith is a device that simultaneously satisfies two requirements that are decisive with regard to a high-grade print quality. Firstly, an evaluation with regard to print quality is carried out on the basis of the entire image-data set of the printed product (printed product:=sheet and/or printed image). A comparison of actual and setpoint values is used in order to detect, for example, hickies, insufficient damping-solution supply, ghosting, register errors, geometrical position errors of the printed image on the sheet and imperfections in the sheet as well as mis-fed sheets. In addition, measured variables for a colour assessment are determined on the basis of the image data of certain regions, yet of at least one pixel of the printed product.

According to advantageous further developments of the device according to the invention, it is provided that either said measured values are visualized on a display means, such as a monitor, and/or the measured values are used to derive a controlled variable for inking control in the individual printing units.

According to advantageous further developments of the device according to the invention, it is provided that the image-capturing apparatus is used both in-line and also off-line, it being disposed, in the latter case, above a deposition device for printed products. Such a deposition device is described, for example, in the hereinbefore cited EP 0 410 253 A2.

If the device according to the invention is used inside the printing press, then a rotation-angle sensor is additionally provided and, in the case of a web-fed rotary printing press, a sensor for detecting the start of the web and/or image may additionally be provided. An electronic trigger module drives the image-capturing apparatus(es) in such a manner that it (they) make(s) available image data from the entire printed product, the geometrical resolution of the image data being irrespective of the printing speed. The image-capturing apparatus may in advantageous manner be at least one camera that scans the printed product line by line.

Particularly in the case of the in-line application of the device according to the invention, the data rate is determined by the resolution, i.e. the number of pixels for each line scanned, and by the printing speed. In order to allow defective sheets as a result of hickies, as a result of insufficient inking or as a result of register errors as well as insufficient colour agreement with an okay printed image to be detected instantaneously, i.e. in real time, the computing apparatus must satisfy corresponding requirements. It must also be ensured that both noise and also crosstalk are largely eliminated, thereby permitting a high quality of signal evaluation.

In-line colour measurement in real time places especially high demands on the accuracy of measurement. Disturbances within the measured region must, in this case, be limited to such an extent that the influence thereof on the measured colour values lies within specified colour tolerances. Since, in particular, angle errors or also position errors of the printed product will lead, during observation of the selected region on the printed sheet, to colour-measuring errors, it must be ensured, both with regard to the optical system and also with regard to illumination, that such angle errors do not result in the uncontrollable falsification of the measured colour values. Specific embodiments that largely eliminate angle errors or colour errors are described hereinbelow in further embodiments of the device according to the invention.

In particular, the image-capturing apparatus or the device according to the invention is designed in such a manner that identical components are used for off-line or in-line functions. This results in system-consistent data; for example, the data of an off-line measuring device may be used as setpoint data for in-line measurements. Furthermore, there are interfaces that make it possible to load in non-system data, such as spectral data.

According to an advantageous further development of the device according to the invention, it is provided that an image-capturing apparatus consists of one or more measuring modules and of at least one correspondingly associated receiving apparatus. As already described hereinbefore, colour measurement or subsequent display and/or closed-loop control calls for data of a high degree of reproducibility. As already described, the computing apparatus must satisfy certain requirements in this respect. Conversely, however, it must also be guaranteed, with regard to the optical system and the conditioning of the image data, that the measured values are not falsified and/or made unusable as a result of uncontrollable influences. The modular construction of the measuring bar caters in excellent manner for these requirements.

The modular construction provides largely homogeneous irradiation of the defined region on the printed product. In addition, the immediate vicinity between the printed product to be scanned and the measuring module means that extraneous radiation, which has a direct influence on the measured signals, is largely blocked out. Particularly in the case of in-line use, the nearness of the object also has a positive effect in the sense that vibrations of the printing press have little disruptive impact on the geometry of the defined image region and, therefore, cause no colour-measuring errors lying outside of specified, allowable tolerances. Colour tolerance always means that change of colour which is perceived by the human eye as a tolerable colour deviation.

Furthermore, the modular construction of the measuring bar also has a positive effect with regard to the speed of processing of the image data. Thus, the parallel input of data is to be viewed as an advantageous preliminary stage to subsequent parallel data processing.

As already described hereinbefore, the image-capturing apparatus consists of one or more measuring modules and one or more receiving apparatus(es), said receiving apparatus(es) generating the image data. With regard to the design of the image-capturing apparatus, mention should be made of two variants. Either the measuring module(s) and the receiving apparatus(es) generating the image data are spatially separate from each other and are connected to each other through the intermediary of image conductors, or, alternatively, the measuring modules and the receiving apparatus(es) generating the image data are integrated into the measuring bar. Whereas the latter alternative is perfectly advantageous for off-line measurements, the first variant exhibits advantages for in-line use, i.e. if the image data are captured inside the printing press. The spatial separation of the opto-mechanical from the electrical or electronic elements of the receiving apparatuses (the highly sensitive CCD line arrays are particularly to be mentioned in this respect) makes it possible for the receiving apparatuses to be placed outside the printing presses. This embodiment largely eliminates mechanical or electromagnetic vibrations, which have a negative effect, especially at the measurement site, on the capture and further processing of the measured values.

A further advantage of the separation of the measuring modules from the receiving apparatuses lies in the fact that the measuring modules—and therefore also the measuring bar—are of relatively small dimensions. The free accessibility of the cylinders of the individual printing units of the printing press is thus kept within reasonable limits. Furthermore, the measuring bar is consequently suitable for a plurality of installation positions.

A further very advantageous embodiment of the measuring bar provides that the measuring bar is of modular construction and consists of individual measuring modules, said measuring modules supplying image data from the defined image region. The modular construction of the measuring bar allows it to be adapted without problem to any desired sizes of the printed product, i.e. to different printing-press widths.

According to an advantageous further development of the device according to the invention, it is provided that each measuring module is associated with at least one illumination apparatus and a front lens system, said illumination apparatus and front lens system imaging the defined image region onto at least one in-line image conductor (single image conductor), wherein, in the case of a plurality of image conductors for each measuring module (multiple image conductors), a corresponding number of in-line image conductors are stacked one above the other. Each image conductor itself is composed of a multiplicity of juxtaposed and possibly stacked light fibres, which are so arranged at the two ends of the image conductor that a geometrically undisturbed image transmission is guaranteed. Each image conductor itself may, in turn, be of either single-layer or multi-layer design.

According to an advantageous further development of the device according to the invention, it is provided that the in-line image conductors, which are in-line at the image end and are stacked, possibly parallel, one above the other, are, at the receiving end, stacked one above the other at defined intervals and thus form a regular layer structure. Of particular advantage is the embodiment in which the image conductors at the receiving end are joined together to form an optical plug-in connector. This makes it easily possible both to vary at will the number of image conductors in the plug-in connector and also—for whatever reasons—to replace the image conductors.

In the case of multi-layer "single image conductors", there are two possible ways of arranging the individual image conductors in the plug-in connector. For example, in the case of a colorimetric measurement, the image conductors of each measuring module corresponding to the X, Y, Z and NIR channels (Near Infra Red, four-layer "single image conductor") are stacked one above the other in blocks at the receiving end; then the outputs of the optical plug-in connector are imaged onto the CCD line arrays through the intermediary of an optical system, said optical system consisting essentially of a beam divider and colour filters (:=colour filters+NIR filter). The second possibility dispenses with the need for the beam divider: the in-line image conductors, stacked one above the other at the image end, are joined together at the receiving end to form a plug-in connector, precisely one image conductor from each measuring module being contained in each block of the plug-in connector. Said plug-in connector, therefore, contains four blocks of image conductors, corresponding to the X, Y, Z and NIR channels. At the output of the plug-in connector, there is already a division of the radiation according to the individual colour channels. Consequently, the beam divider can be omitted in this version. Through the intermediary of an optical system, consisting essentially of colour filters, the defined image region is imaged onto the correspondingly associated receiving apparatus. It should be noted with regard to this second version that the omission of the beam divider leads to losses in respect of local resolution. This disadvantage, however, can be compensated for on the software side in that the spatially separate measurement sites of the individual colour channels are transformed into the correct geometry.

According to an advantageous embodiment of the receiving apparatus, it is provided that the receiving apparatus consists of a number of photosensitive elements disposed parallel to each other at defined intervals, the number of which photosensitive elements determines the local resolution of the image-capturing apparatus. The receiving apparatus is advantageously a CCD line array. Coupled to the CCD lines or the CCD line arrays is a conventional electronic trigger module that serves to drive the CCD lines or CCD line arrays in clocked manner, to amplify the signals, to scan the signals and to provide A/D conversion. Present at the output of the receiving apparatus are then the image data of the entire printed product.

The CCD elements must be precisely adjusted with respect to the ends of the image conductors, since otherwise there will be image disturbances (convergence error, alignment). In order to minimize the outlay on adjustment, the following is proposed according to an advantageous further development of the device according to the invention: the output of the image conductors is succeeded by a field stop with a plurality of gap-shaped openings. The gap-shaped openings define the region of the associated image conductors that is to be imaged onto the respective CCD lines. In particular, it is provided that the cross section of the image conductors is greater than the field stop, and that the output of each image conductor is adjustable, with respect to the optical axis of the first lens system, in a holder at the receiving end of the image conductors. The number of adjustment operations, therefore, is identical to the number of image conductors; i.e. the number is relatively small. The image of an image-conductor end on the associated CCD line is advantageously smaller in the printing direction than the height of the CCD line itself, this permitting greater adjustment tolerances.

In order likewise to keep the optical tolerances very low, particularly for inking control, the receiving unit is optically formed in the following preferred embodiment:

the ends of the image conductors are imaged onto the CCD lines by means of two lens systems, the two associated lens systems each being disposed at the focal point of the other lens system, with the result that the intermediate space is, in the ideal case, parallel transilluminated (4-f arrangement).

According to a preferred embodiment, the beam divider is likewise accommodated in said intermediate space, with the result that imaging is accomplished by means of one first lens system and four second lens systems. With regard to colour measurement, this arrangement has the advantage that only one optical filter per colour channel is required for all optical modules. In this case, a comparable filter behaviour is guaranteed for all image points, since the individual filters are perpendicularly traversed by the radiation.

In particular, the aforementioned 4-f arrangement of the lens systems allows the use of partial filters. Thus, according to a further development of the device according to the invention, it is provided that the colour filters consist of a plurality of different filter parts (partial filters), said filter parts being able to be displaced in relation to the field stop. This serves for the fine matching of the transmission curve of the corresponding colour channel.

An embodiment of the device according to the invention provides that the field stop comprises a blacked-out region between the position of the image information and the position of a white reference of the illumination apparatuses of the measuring modules. The injection of the white reference serves for the normalization of the individual illumination apparatuses with respect to each other. The afore-described division of the injection region from the actual image-transmission region provides a clear separation of the two regions.

In order to provide reliable adaptation of the geometries of the image-conductor ends, stacked in the plug-in connector, to the geometry of the CCD lines, it is proposed according to an advantageous embodiment of the device according to the invention that an opto-mechanical coupling member is provided. Said coupling member consists of a front block and a rear-side block, said blocks being connected to each other through the intermediary of light guides. Whereas the front block is adapted to the geometry of the image-conductor stack, the rear-side block has the geometry of the CCD lines. Said coupling member is easier to handle from the manufacturing viewpoint than the relatively long image conductors that connect the measuring bar to the receiving unit. Furthermore, on account of the optical laws of imaging, the geometry of the CCD lines is connected with the geometry of the image-conductor stack through the reproduction scale of the optical system. This embodiment proves extremely useful since, in general, there is no guarantee that the geometrical dimensions of image-conductor stack, optical system and receiving apparatuses will match each other—for example, for technological or economic reasons, there may be upper or lower limits with regard to the dimensioning of these components or it may be economically advisable not to specify the plug-in connector in a size matching the imaging, but to make it bigger.

The following advantageous further developments of the device according to the invention relate to the illumination of the defined image region.

The illumination may be either direct or indirect. In this connection, indirect illumination means that radiation from a cold-light illuminator is directed into the selected image region through a shape converter and a mirror, for example a cylindrical mirror. Such indirect illumination is suitable particularly in the case of the integrated design of the measuring module, i.e. in cases where the temperature-sensitive receiving apparatuses and electronics are integrated into the individual measuring modules.

In the case of direct illumination, the radiation falls from the illumination apparatus more or less directly into the selected image region. Since, for reliable colour measurement, it is of great importance that the radiation exhibits a homogeneous distribution in the selected image region—this means, in particular, that there must be no lateral fluctuations—it is provided according to a further development of the device according to the invention that the radiation is directed into the selected region through an oblong elliptic mirror. Owing to the favourable spectral reflection characteristics, the elliptic mirror may, as desired, be chrome-coated or, alternatively, it may consist of aluminium with a silicon-oxide coating.

For the normalization, regulation and calibration of the illumination apparatuses with respect to each other, it is provided that the radiation of each individual illumination apparatus is coupled onto a light guide, the output of which is connected directly to the corresponding image conductor and is measured in each of the colour channels. Consequently, it is possible for measured values to be made available for each illumination apparatus, said colour measured values subsequently being normalized to the corresponding values of a standard light source. In particular, a lamp closed-loop control is provided, said lamp closed-loop control adjusting the current for the illumination apparatuses in such a manner that the radiation intensity of said illumination apparatuses is mutually balanced.

Apart from the lateral homogeneous illumination of the defined image region, it must also be ensured that the radiation has a spectral composition that is constant with respect to time. Furthermore, the radiation intensity should, to some extent, be uniform throughout the entire relevant wavelength range, which is between approx. 400 nm and "Near Infra Red" (NIR). Furthermore, in order to provide reliable inking control, the spectral composition of the measuring radiation as a function of the measurement site on the printed product and also as a function of the type of printing substrate must be within permissible colour tolerances. Only if this is guaranteed can the same spectral correction function, i.e. the same colour filter or optical filter (NIR), be used for any measurement site and any type of printing substrate.

It is advantageous to employ as illumination apparatuses precision halogen lamps that are controlled by separate, programmable precision power sources. As a result of the aforedescribed injection of the radiation from the illumination apparatuses (white value) onto the individual image conductors, the light from the illumination apparatuses is measured in each of the spectral colour channels. The measured values are normalized with the corresponding measured values from a standard light source. The latter exhibit a correlation with the temperature T. If the normalized measured values are plotted against the corresponding colour channels, then the relative intensities vary as a function of the temperature. On the basis of these relative intensities, the current of the associated illumination apparatuses is controlled via an inverting amplifier. Thanks to this type of lamp closed-loop control on the basis of the colour temperature of the illumination apparatuses, it is ensured that each of the illumination apparatuses emits radiation of equal intensity throughout the entire relevant spectral range.

For precise adjustment of the light guide with respect to the respective illumination apparatus, it is provided that the light guide is disposed in a hole, the axis of said light guide being directed at the illumination apparatus. In particular, the light guide is adjustably disposed inside said hole.

According to an advantageous further development of the device according to the invention, said further development likewise satisfying the high requirements with regard to the resolution of the measured colour values, it is provided that the computing apparatus uses the value of the white value of each illumination apparatus, instantaneously measured and averaged in each colour channel, for the normalization of the measured colour values and subtracts therefrom the instantaneously averaged dark current of the CCD lines.

The image data are captured in each case from the finished printed product. Therefore, in the case of a sheet-fed rotary printing press, the image-capturing apparatus is associated preferably with the impression cylinder of the last printing unit or additionally with the impression cylinder before the turning drum if the sheet-fed printing press is operated in recto-and-verso printing mode. In the case of a web-fed rotary printing press, two image-capturing apparatuses are provided for the two-sided scanning of the printed web. It is advantageous, in a web-fed rotary printing press, for the image-capturing apparatuses to be associated with the cooling rollers or with the idler rollers thereafter. This measure guarantees that the printed image is captured from the dried printed product. Since the specularly reflected radiation at the measurement site is increased by damping solution, it is thus possible, with this arrangement, to dispense with the need for polarization filters, which must be introduced into the optical path in order to suppress the specularly reflected radiation.

Measures have already been described hereinbefore that minimize the dependence of the measured colour values on the measurement site in such a manner that the fluctuations of the measured colour values caused as a result of such dependence remain within permissible colour tolerances. However, the measured colour values are not only dependent on lateral variations; they depend also on the object distance. Consequently, it must be ensured that the printed product is at a well defined distance from the illumination apparatus or, in particular, from the front lens system. Of course, the reproducibility of the measurement site on the printed product is also of great significance with regard to the correlation between rotary-position-sensor signals and printed image of the printed product. Through the blowing of an air stream against the transport direction onto the printed sheet, the printed sheet is fixed on the impression cylinder. According to an advantageous embodiment of the blast-air apparatus, it is provided that the pressure of the blast air is selected according to the characteristics of the printed product, for example according to the thickness or stiffness of the printed product. The inputting of the thickness or stiffness of the printed product at an input apparatus allows the blast air to be controlled automatically through the intermediary of a controller. For example, a high blast-air pressure is provided for cardboard, whereas, in the case of low thickness or stiffness of the printed product, a lower blast-air pressure is selected, since, in the case of thin, flexible papers, high pressures might result in wave formation, which would run precisely counter to the actual purpose and intent of applying blast air to the printed product.

In addition, the fixing of the printed product can be achieved by the suction-gripping of the printed product on the cylinder or by the electrostatic charging of the printed product and/or of the cylinder. In particular, it is provided that the blast-air nozzles are controlled on the basis of the image data. Thus, for example, it is also possible to supply blast air to the blast-air apparatus in a variable manner—at the sides and in the printing direction—in order to suit the size of the printed product. In an advantageous embodiment, it is provided that the blast-air-supply apparatuses are of such design that the blast-air stream is used simultaneously in order to cool the illumination apparatuses.

An absolute colour measurement requires the photometric calibration of the image-capturing apparatuses. Conventionally, barium sulphate (absolute white) is used for normalization in the case of colour measurements. Since barium sulphate is available only in tablet form as compacted powder, it is hardly suitable for on-line use. As a substitute it is possible to employ a plastic tile (calibration white), the optical properties of which are known in relation to barium sulphate.

The calibration white, for example, is disposed on the surface or on a region of the surface of the cylinder or, alternatively, it is situated on a separate carrier in the cylinder gap of the respective cylinder with respect to which the image-capturing apparatus is positioned. Conventionally, the image-capturing apparatuses are calibrated during breaks in printing. If, however, the calibration white is disposed in the cylinder gap of the cylinder, calibration can be carried out also during the printing process in the case of sheet-fed printing presses.

Apart from colour calibration, it is also necessary during operation to check the stability of various operating parameters. For this purpose, (self-luminous) "calibration surfaces" are placed in the optical path at a suitable point. For example, this measure serves to check the dependence on time. If necessary, a message is sent to the operator when a new colour calibration is required.

A further solution envisages the following: an additionally connected image-conductor layer at the end of the image conductors "looks" onto the "calibration surface".

A particularly advantageous embodiment with regard to the calibration of the image-capturing apparatuses can be implemented as follows:

The measuring bar is associated with a protective housing. Both, the measuring bar and the protective housing, have a common shaft. The measuring bar is swivellable about the shaft and is lockable in two positions, a measuring position and a parked position. In the measuring position, the printed product on the cylinder is scanned.

Advantageously, the radiation from the illumination apparatus strikes the surface of the printed product at an angle of 45°. During breaks in printing, the measuring bar is swung into the parked position and is then inside the protective housing. Firstly, this protects the sensitive optical systems from splashwater (the rubber blanket is normally washed during breaks in printing).

However, according to an advantageous further development of the measuring bar according to the invention, it is also provided that the calibration white is disposed in the protective housing. In particular, the protective housing is dimensioned in such a manner that the optical intersection point of the respective illumination apparatus and of the front lens system in the parked position is focussed on the surface of the standard light source. Advantageously, the standard light source is disposed across the entire width of the protective housing.

The optical system, which images the outputs of the image conductors or the intermediate image onto the respective receiving apparatuses, may be of various design, particularly in the case of integrated embodiments of the device according to the invention. Thus, on the one hand, it is possible for the optical system to be a beam divider, the individual outputs of which are associated with optical filters with imaging optics. It has proved particularly advantageous to illuminate the defined image region at an angle of 45° and to dispose the front lens system perpendicularly to the surface of the printed product. The reverse arrangement of illumination apparatus and front lens system is, however, likewise possible.

In a particularly advantageous further development of the device according to the invention, it is provided that a partial filter is disposed at the common focal point of two lens systems of the optical system.

A further very advantageous embodiment of the device according to the invention—an embodiment that may be employed both in the separate and also in the integrated version of the image-capturing apparatus—provides that the optical system is a prism or a grating. As is known, both cause the spectral dispersion of the measuring beam. The measuring beam of each image point (pixel) of the defined region of the printed product is dispersed into a spectrum; the spectrum is imaged onto parallel-disposed CCD elements (two-dimensional array). Since spectral measured values are made available from each individual pixel of the defined image region, a spectral resolution is additionally obtained. The spectral, locally resolved measuring beam is received by a two-dimensional CCD array and is subsequently converted into image data. A particular advantage of this embodiment proves to be the fact that the computing apparatus is subsequently able to weight the spectral measured values in such a manner that any, desired filter functions are simulated through the software. There is no need, therefore, for the colour filters or, consequently, for the high requirements that are conventionally placed on the filter functions of such colour filters with regard to a reliable colour measurement.

According to the invention, the image data of the entire printed product are used both for image inspection and also for inking control. In particular, it is provided that the computing apparatus divides the shading-corrected and logarithmized image data into data for image inspection and into data for inking control. For image inspection, use is made of differential-image data which are combined with pixel-wise stored values of a separate memory and are further processed as weighted differential-image data. Said memory contains, firstly, information on whether the image point in question is used not only for image inspection but also for colour measurement; secondly, stored, e.g. in coded form, in said memory is the weighting that is to be applied to a difference between a setpoint image value and the corresponding actual image value. It is advantageous for the computing apparatus to normalize and compare the image data for image inspection with respect to corresponding setpoint data. Further provided is a memory that accumulates the differential-image data pixel by pixel. The computing apparatus monitors both the current and also the accumulated differential-image data with corresponding thresholds. On the basis of the accumulated differential-image memory and a computer, it is possible to determine the ink demand of a zone, since the complete image data are available. For example, this information can be used to specify the point in time at which lateral distribution of the ink is to start.

Defects within the printed image are detected on the basis of the differential image. Such defects are, for example, hickies, scumming regions behind full-tone areas as a result of insufficient damping-solution supply and also register errors.

According to the invention, the image data are used also for inking control according, for example, to colorimetric variables. For this purpose, the computing apparatus selects from the image data at least one coherent region e.g. for each ink zone. in the minimum case, the coherent region is an image point (pixel). Furthermore, the computing apparatus determines the actual colour locus of said region, compares it with the correspondingly specified setpoint colour locus and, if the colour difference is not within tolerance, initiates a compensatory adjustment of the corresponding inking actuators of the individual printing units. A closed-loop inking-control system according to colorimetric variables is already known from the prior art. Reference is made in particular to EP 0 324 718 A1, which is to be viewed as an integral constituent part of the present patent application.

Alternatively, according to an embodiment of the device according to the invention, it is provided that the operating personnel selects, via an interactive interface, suitable image regions for inking control. In particular, image regions and setpoint values relevant for inking control may also be made available by an off-line measuring device of the computing apparatus. Provided for this purpose are defined interfaces which permit the incorporation of additional devices into the control process.

The coherent regions are selected on the basis of certain criteria. For example, care is taken to ensure that the selected region contains a maximum of four colours in as homogeneous a distribution as possible. In particular, therefore, use is made for inking control of fields, e.g. grey fields, that are characterized in that colour errors become apparent quickly and accurately.

Of course, the coherent regions may also be measuring fields of a colour-control strip.

On the basis of the complete image data set of the printed product, a region of high information content and of relevance for inking control is selected either automatically or interactively with the operator. Through a graded classification of each image point (parameter memory), the suitability of each image point for colour measurement, inter alia, is examined during the printing process. Thus, image areas with geometrical or locally limited errors are sorted out—this being accomplished in particular by automatic means—and are not used for the following colour measurement/colour display/inking control. The capture of all image data of the printed product also makes it possible without any major problems to select specific measuring points on the basis of a proof sheet or an okay sheet. The data from an off-line measuring device with regard to the size and position of the selected regions can be transmitted to the computing apparatus without any major expenditure of time.

Register errors have an effect on the colour sensation. Therefore, inking control is only worthwhile when it has already been ensured that the printed products are in register. For this purpose, if the resolution of the image-capturing apparatus is not sufficient, at least one register sensor, e.g. a register camera, is additionally provided in-line or off-line, such register camera consisting, for example, of a two-dimensional CCD array. Such a register camera makes it possible to detect and correct register deviations of the individual printing units with respect to each other. According to an advantageous embodiment of the register-measuring apparatus, it is provided that said register-measuring apparatus is disposed on a cross-member with respect to a corresponding impression cylinder in the printing press. In the case of a web-fed printing press, at least one register camera is provided on either side for the two-sided scanning of the printed product, said register camera carrying out a register measurement on the printed product. In particular, said register camera is likewise associated with the impression cylinder of the last printing unit (sheet-fed printing press) or, alternatively, with the cooling rollers or idler rollers (web-fed printing press).

Hereinbelow, the invention is explained in greater detail with reference to the drawings, in which.

Figure 7A:
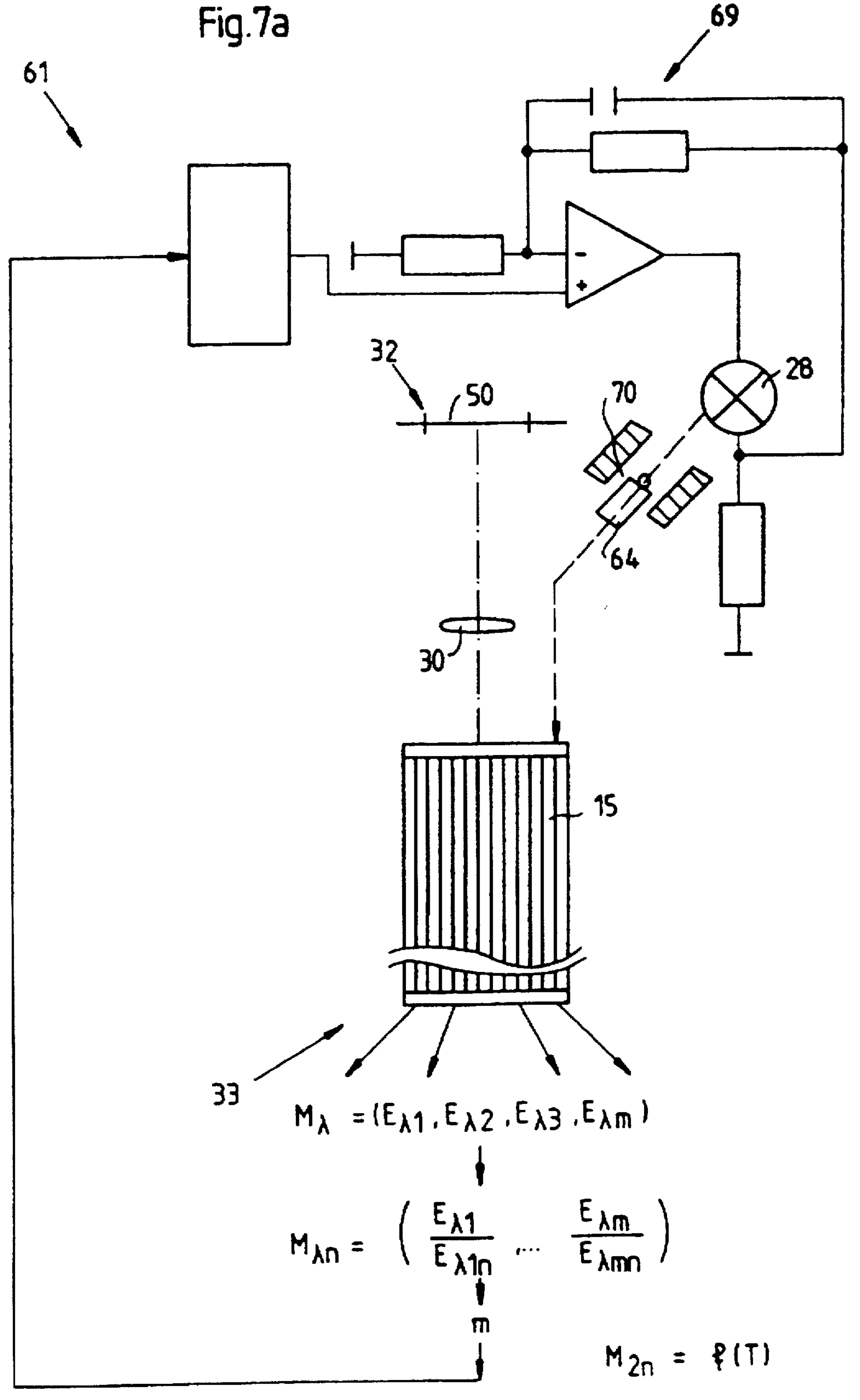
Figure 7B:
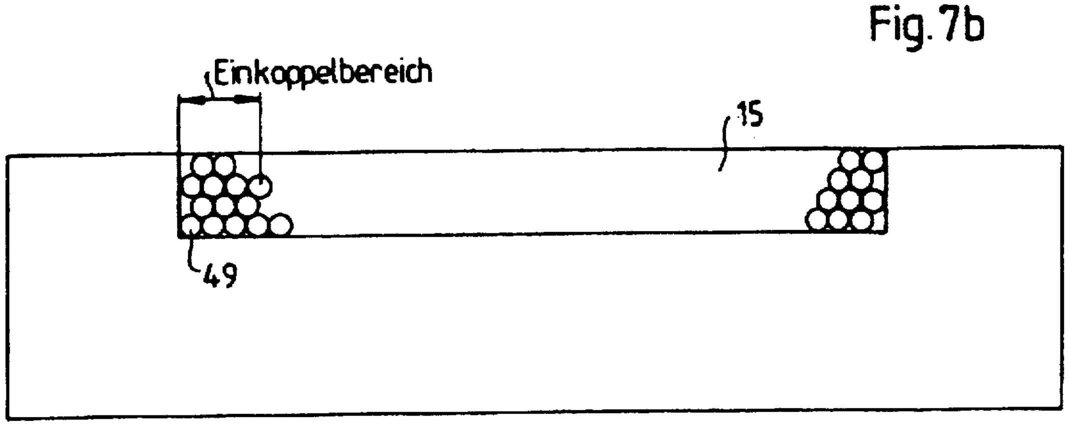
Figure 9:
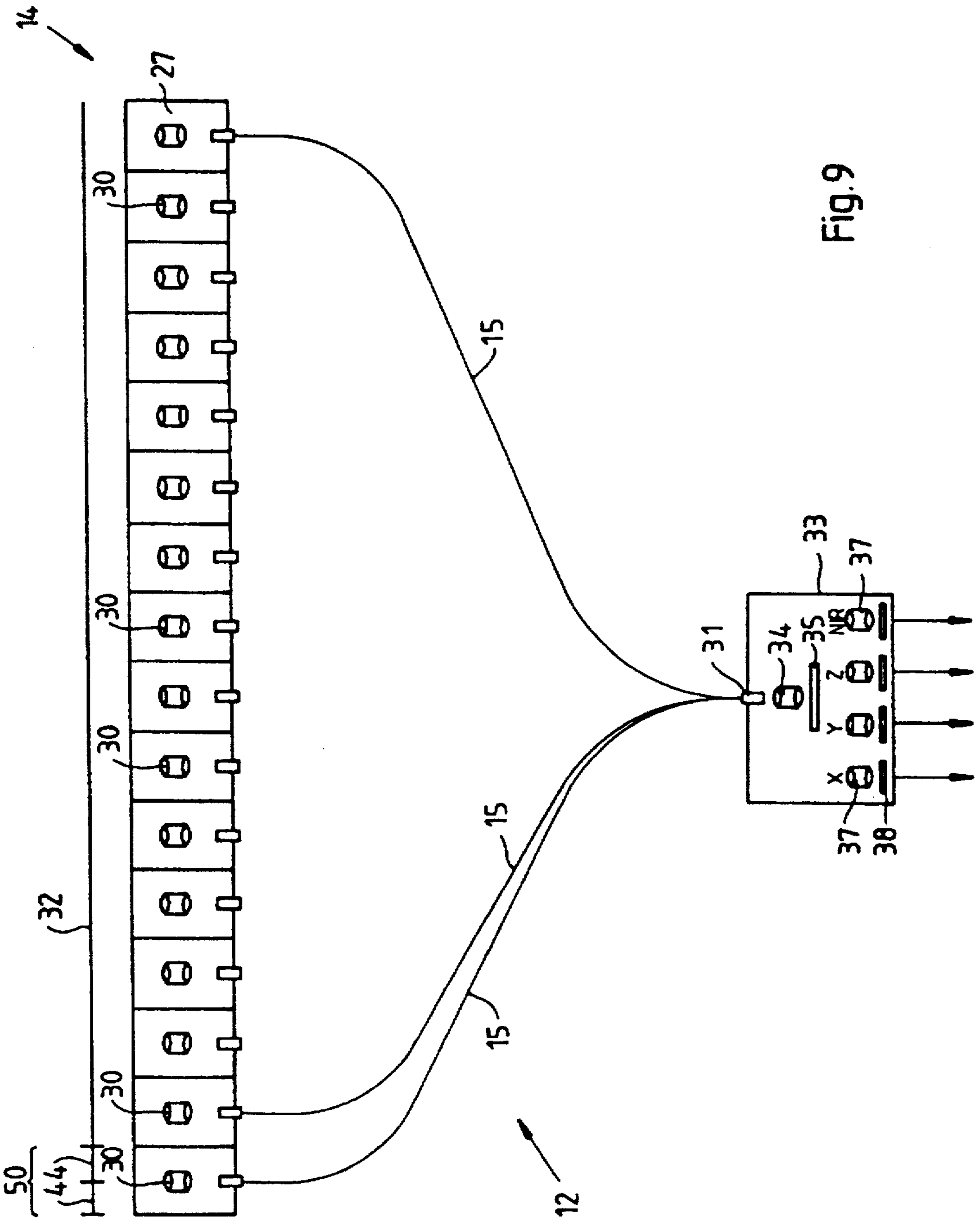
Figure 10A:
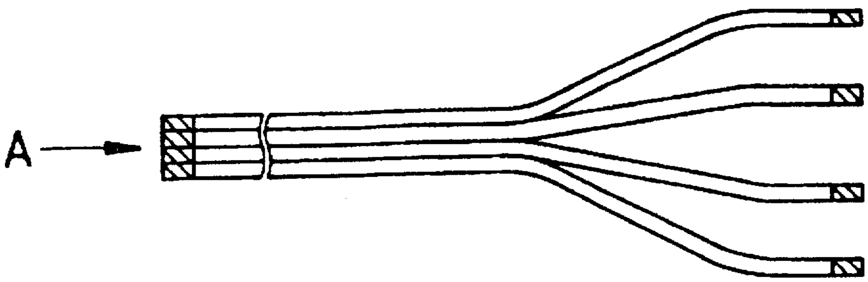
Figure 10B:
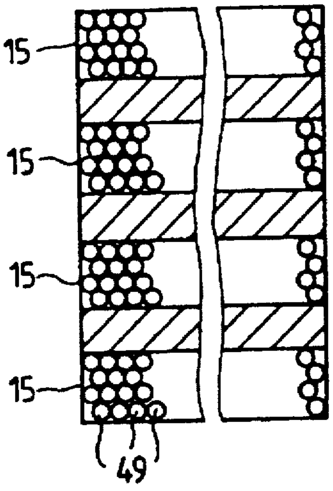
Figure 11:
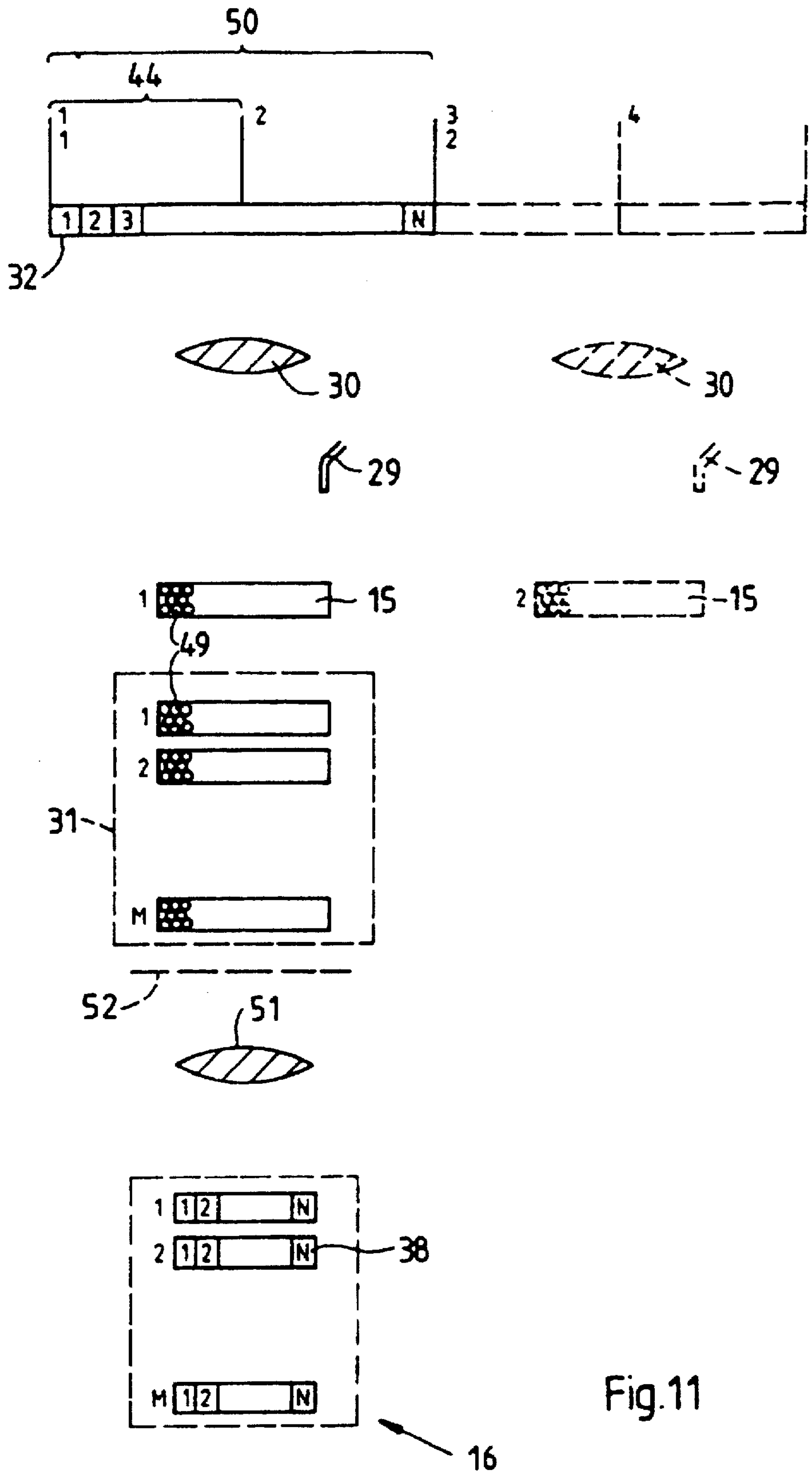
Figure 12:
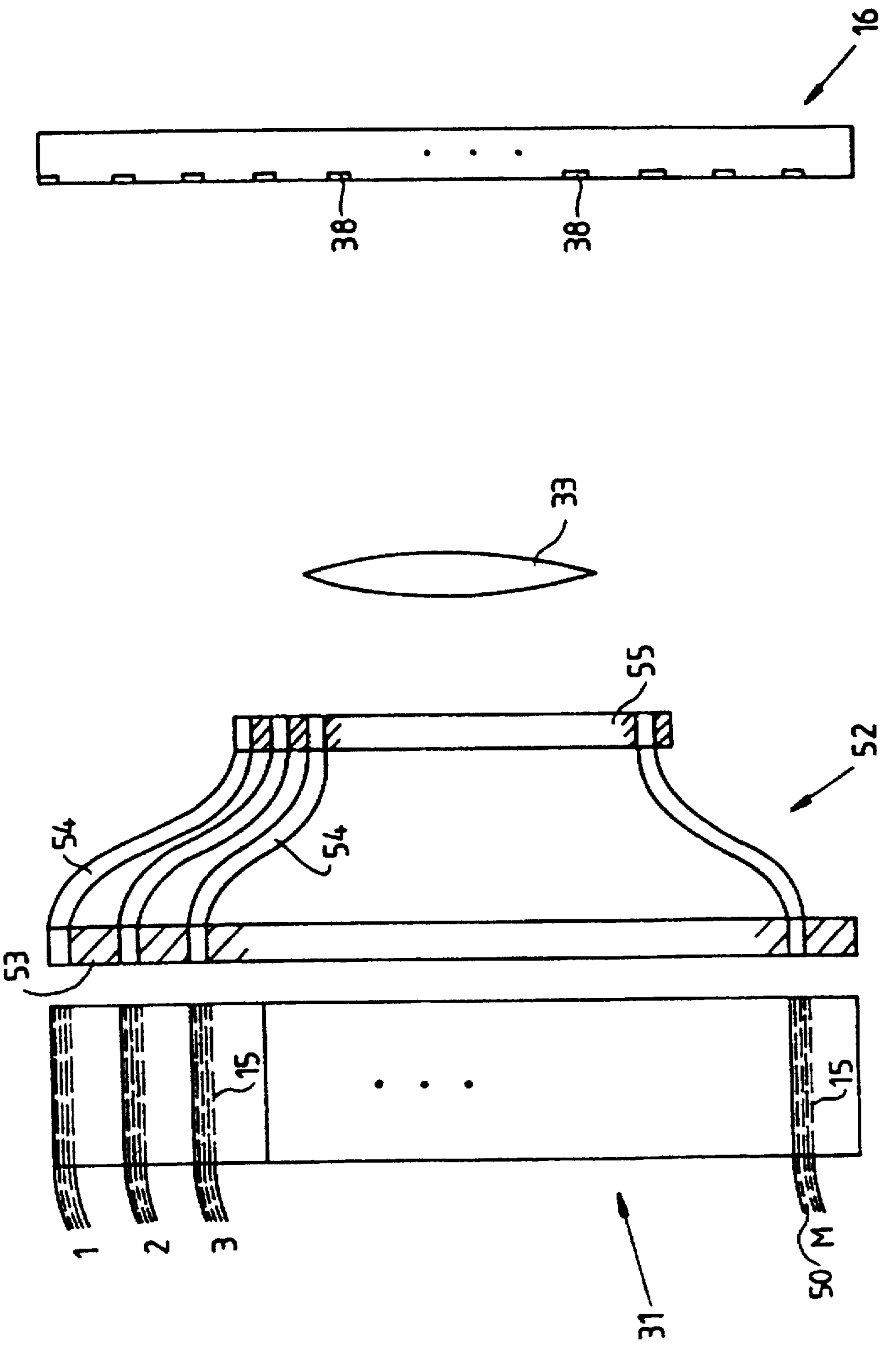
Figure 13A:
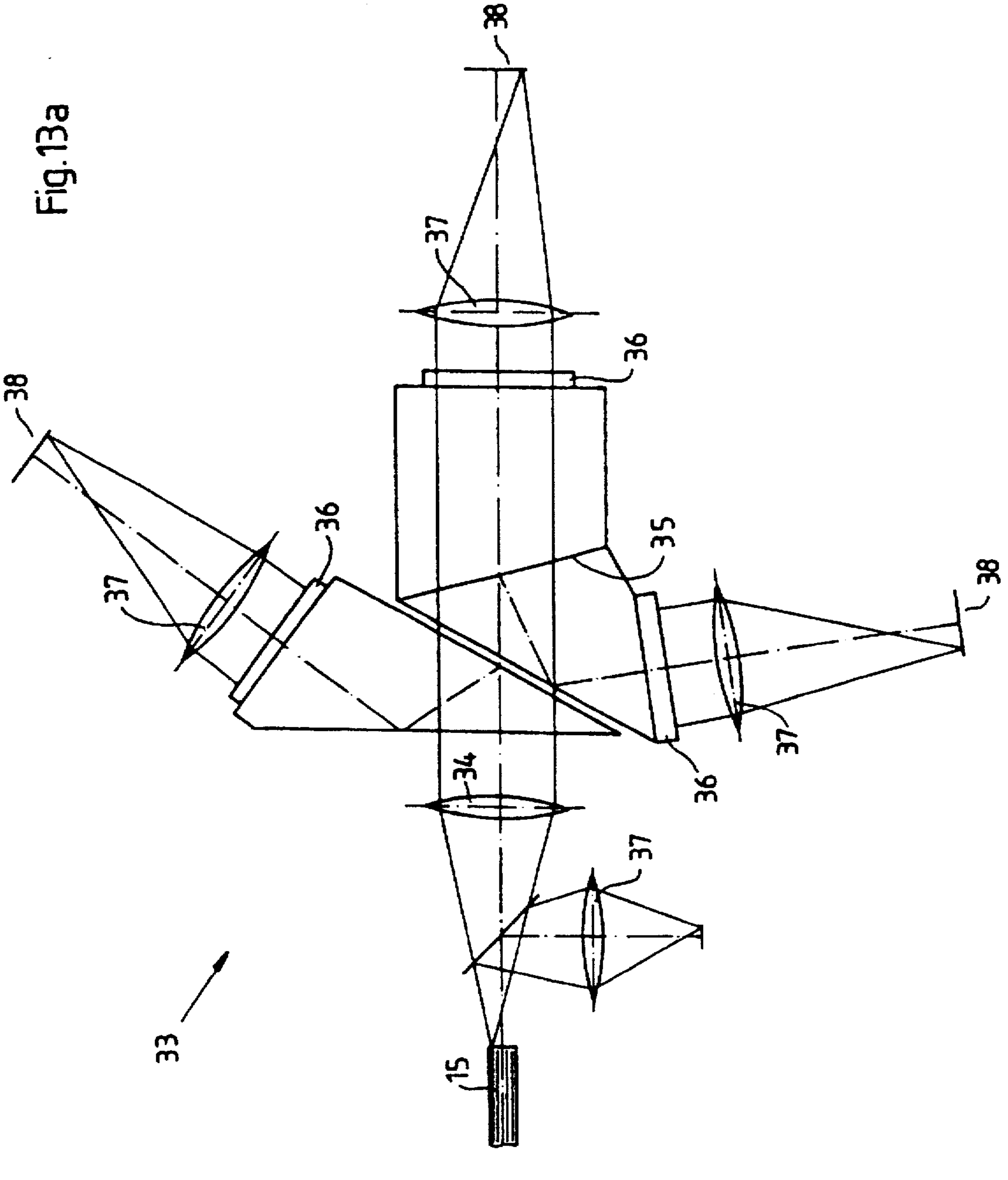
Figure 13B:
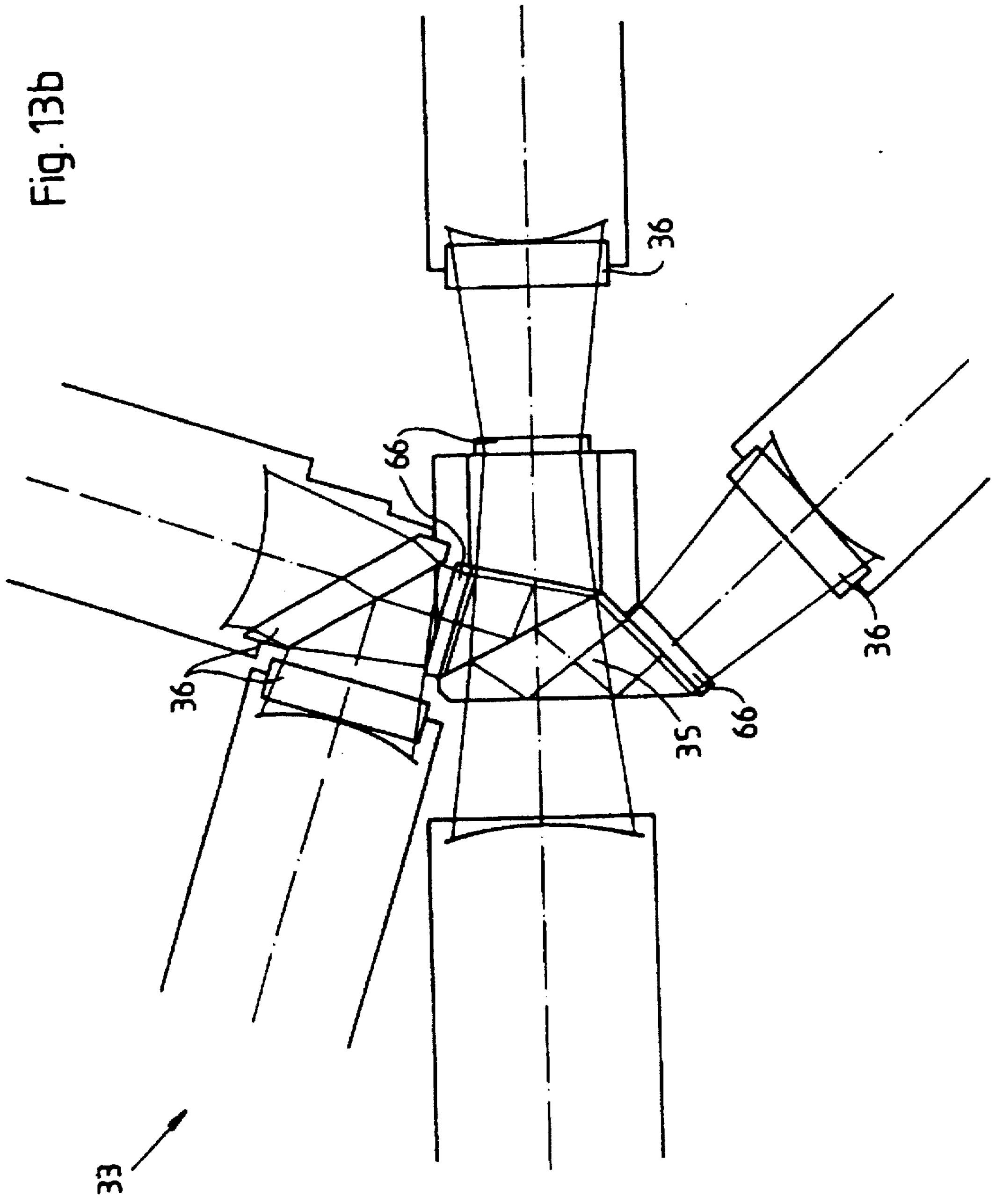
Figure 14:
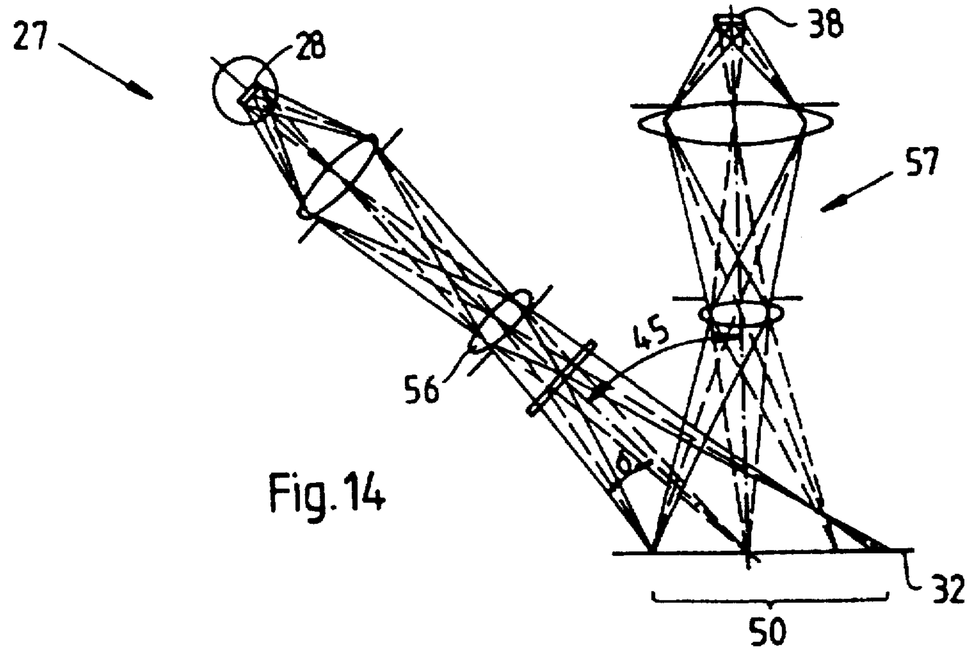
Figure 15:
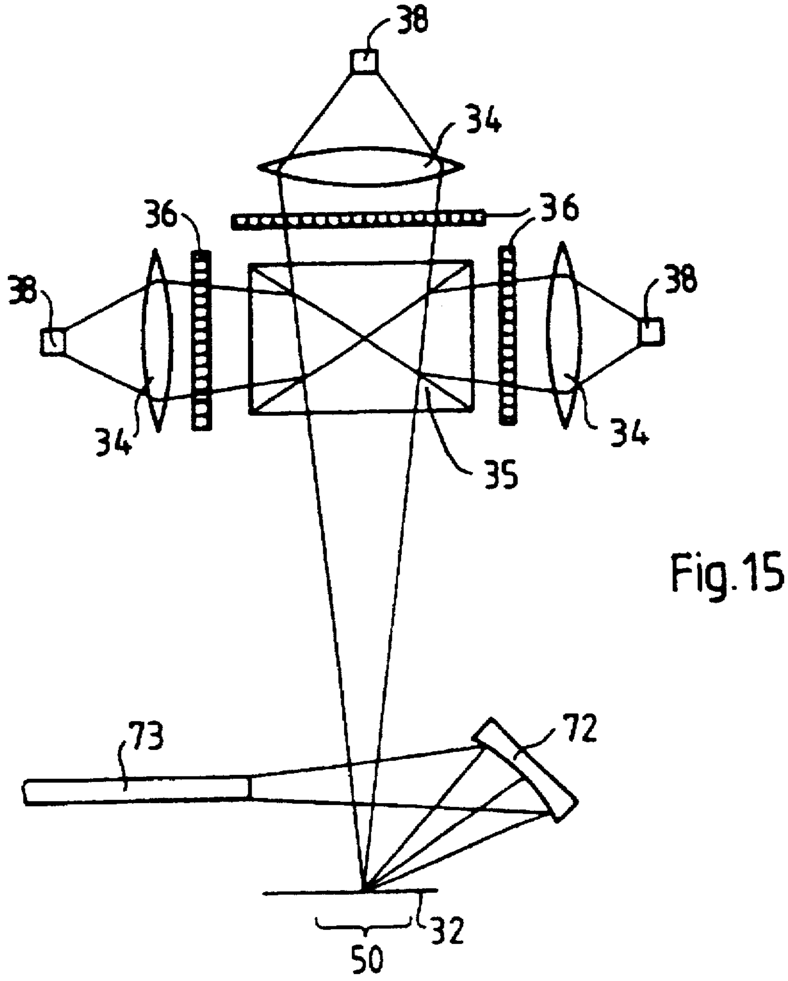
Figure 16:
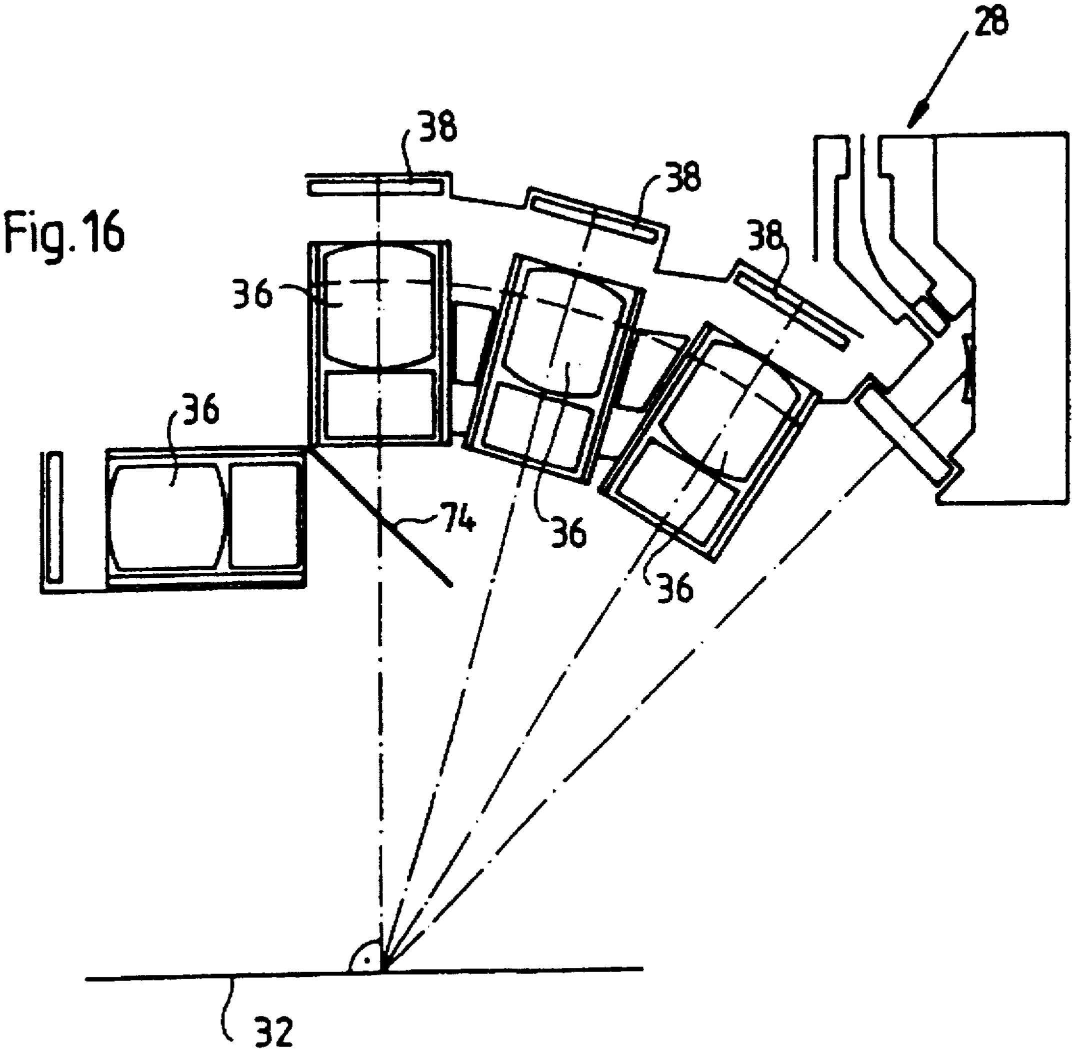
Figure 17:
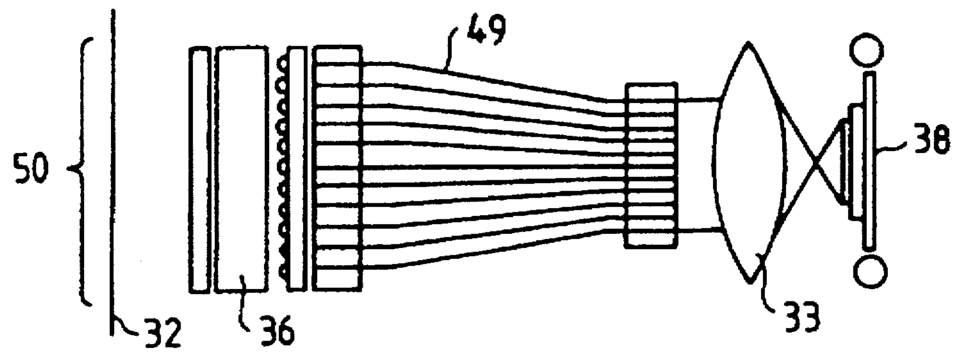
Figure 18:
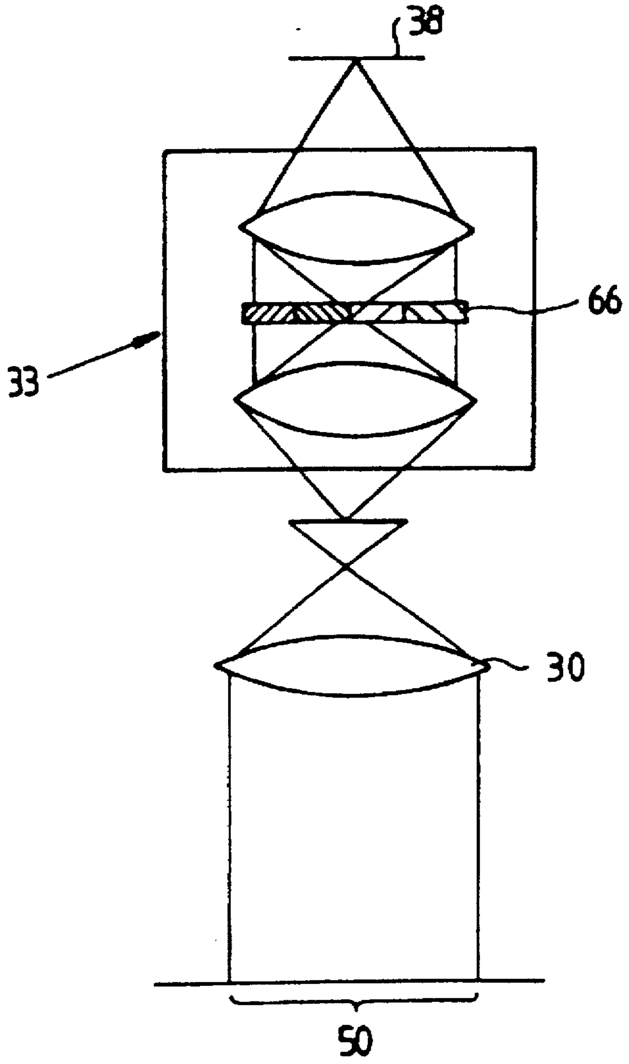
Figure 19:
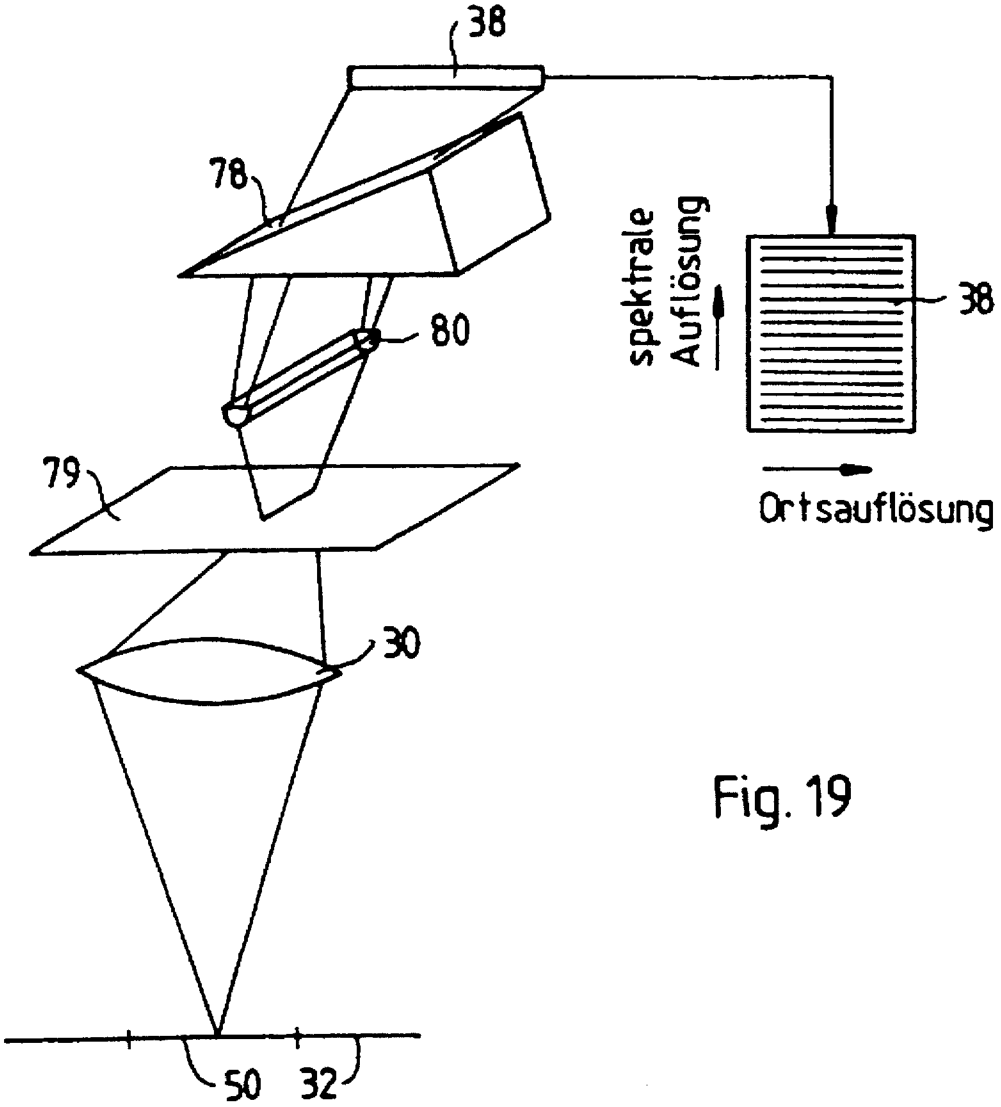

FIG. 7*a*) shows a block diagram relating to the closed-loop control of the illumination apparatuses;

FIG. 7*b*) shows a cross section through an image conductor with injection of a white reference;

FIG. 8 shows a cross section through the measuring bar according to an embodiment of the device according to the invention;

*a*) in the measuring position;

*b*) in the parked position;

FIG. 9 shows a schematic representation of an embodiment of the device according to the invention with multi-layer single image conductors;

FIG. 10 shows schematic representations of an embodiment of the device according to the invention with quadruple image conductor;

*a*) shows a side view of the quadruple image conductor;

*b*) shows a top view of the quadruple image conductor according to marking A in FIG. 10*a*);

*c*) shows the imaging of a defined image region onto the receiving apparatus according to the embodiment from FIG. 10*a*) or from FIG. 10*b*);

FIG. 11 shows the arrangement of a coupling member between the image-conductor ends and the receiving apparatus;

FIG. 12 shows a longitudinal section through the connecting member between image-conductor ends and receiving apparatus according to FIG. 11;

FIG. 13*a* shows a longitudinal section through an embodiment of a beam divider used with the device according to the invention;

FIG. 13*b* shows a longitudinal section through a further embodiment of a beam divider used with the device according to the invention;

FIG. 14 shows a sketch of the measuring geometry and of the optical path in a measuring module;

FIG. 15 shows a first embodiment of a measuring module with integrated receiving apparatus;

FIG. 16 shows a further embodiment of a measuring module with integrated receiving apparatus;

FIG. 17 shows a third embodiment of a measuring module with integrated receiving apparatus;

FIG. 18 shows a fourth embodiment of a measuring module with integrated receiving apparatus; and FIG. 19 shows an embodiment of the device according to the invention.

Figure 1:
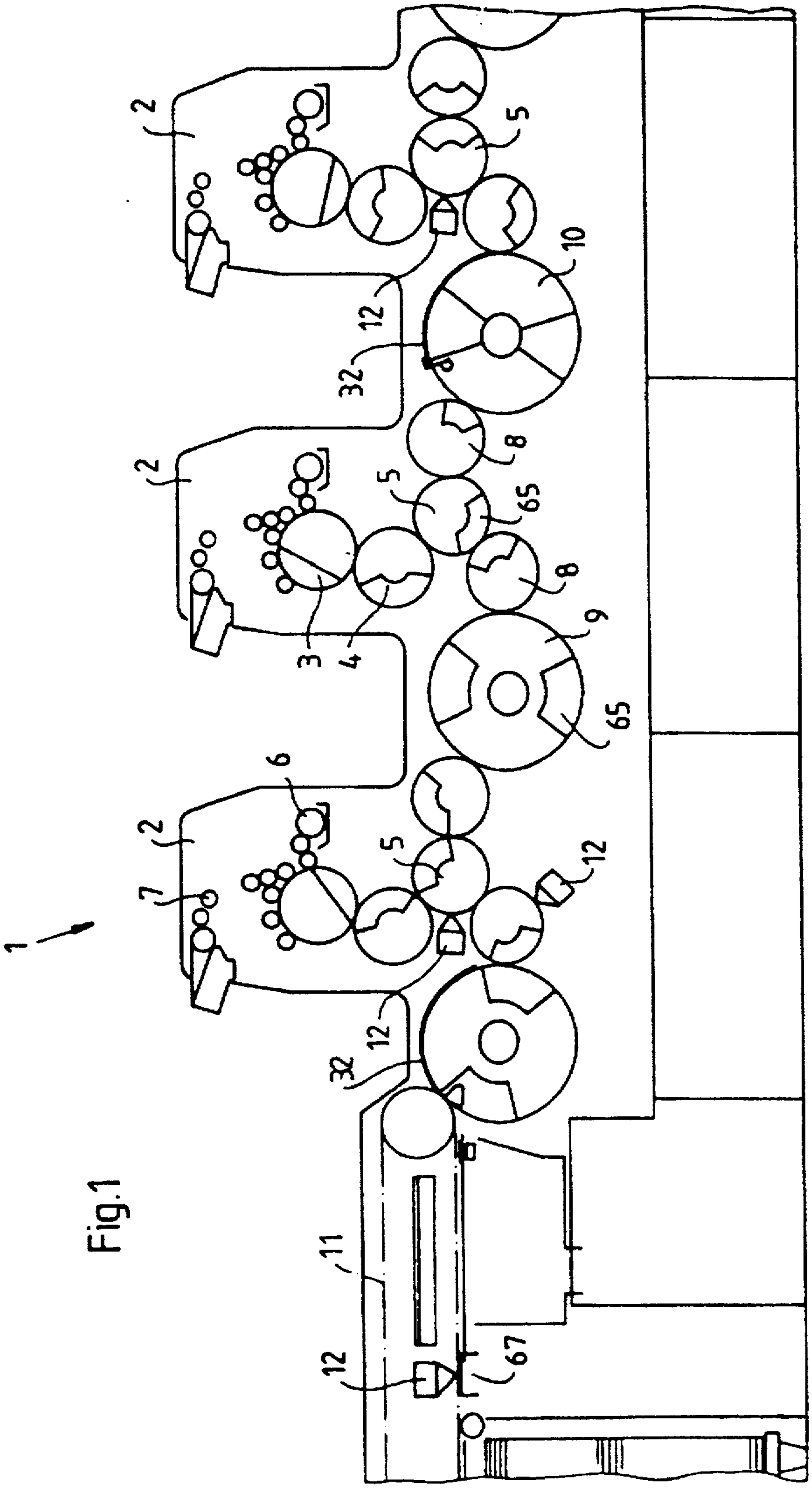
FIG. 1 shows a longitudinal section through a printing press with the device according to the invention.

FIG. 1 shows a longitudinal section through a partial region of an offset printing press 1, the drawing showing in particular the arrangement of the image-capturing apparatuses 12 with respect to individual cylinders 5 of the printing press 1. The printing press 1 is composed in known manner of a plurality of printing units 2, of a feeder (not separately shown in FIG. 1) and of a delivery 11.

Each of the printing units 2 exhibits the conventional cylinder configuration: plate cylinder 3, rubber-blanket cylinder 4 and impression cylinder 5. The printing plate, mounted on the plate cylinder 3, is damped through the intermediary of the damping unit 6 and is inked with the appropriate ink through the intermediary of the inking unit 7.

The sheet is conducted between the individual printing units via the transfer cylinders 8 and the half-speed transfer drum 9 and, in the case of recto-and-verso printing, via the turning drum 10. In the individual printing units 2, the sheet 32 is printed successively between rubber-blanket cylinder 4 and impression cylinder 5 with the individual colour separations.

In the case of one-sided printing, the image-capturing apparatus 12 is associated with the impression cylinder 5 of the last printing unit 2. In the case of a printing press performing recto-and-verso printing, a further image-capturing apparatus 12 is associated with the impression cylinder 5 before the turn.

However, it is also perfectly possible to position the image-capturing apparatus 12 with respect to the turning drum 10 or with respect to the last transfer drum 9 before the delivery 11. It is also possible to scan the image of the printed product 32 in the region of the delivery 11. Here too, of course, it must be guaranteed that the printed product 32 assumes a clearly defined position during the capturing of the image. In particular, a stabilizing element 67 is provided for this purpose in the region of the sheet guiding in the delivery 11. The image-capturing apparatus 12 is disposed above said stabilizing element 67 and captures the image data of the printed sheet 32.

Figure 2:
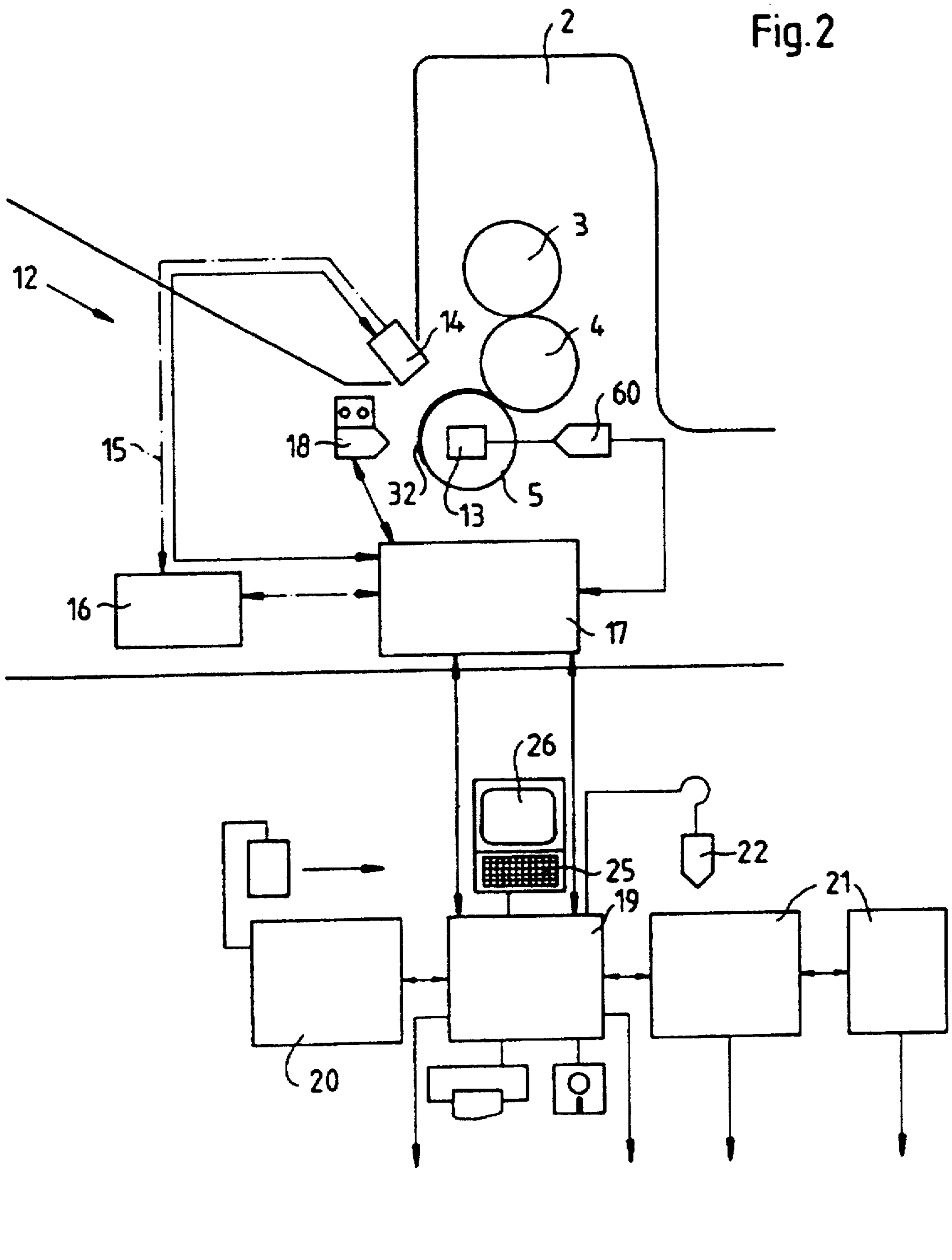
FIG. 2 shows a schematic representation of the system components of an embodiment of the device according to the invention in the case of a sheet-fed printing press.

FIG. 2 shows a schematic representation of the system components of an embodiment of the device according to the invention in the case of a sheet-fed printing press. Once again, the printing unit 2 exhibits the conventional offset cylinder configuration: plate cylinder 3, rubber-blanket cylinder 4 and impression cylinder 5. Installed on the shaft of the impression cylinder 5 is a rotation-angle sensor 13, which transmits information on the instantaneous angular position of the printing press 1 to the computing apparatus 17.

The measuring bar 14 is mounted above the impression cylinder 5. While the printing process is in operation, the individual measuring modules 27 of the measuring bar 14 capture, line by line, the image data of the finish-printed sheet 32.

The measuring modules 27 of the measuring bar 14 are spatially separate from the receiving apparatuses 16, which may advantageously be, inter alia, lines of CCD elements 38. The connection is accomplished by image conductors 15. This spatial separation of the optical component of the measuring bar 14 from the receiving apparatuses 16 and from the electronic processing of the image data automatically eliminates the thermal loading of the latter elements, which thermal loading would occur at the measurement site as a result of the illumination apparatuses 28 of the measuring bar 14. In addition, thanks to this physical separation, it is easily possible to keep the receiving apparatuses 16 away from mechanical vibrations of the printing press 1 as well as from interfering electromagnetic radiation. A further advantage—resulting of necessity owing to the aforementioned physical separation, yet of decisive significance with regard to the positioning of the image-capturing apparatus 12 in the printing press 1—is the relatively small size of each individual measuring module 27 of the measuring bar 14. Since, according to the embodiment shown in FIG. 2, only a few optical components are accommodated in each of the individual measuring modules 27 of the measuring bar 14, the measuring bar 14 can easily be dimensioned in such a manner that it is relatively simple to place within the printing press 1.

The reflectance values of the image points of the entire printed sheet 32 are available in the form of digital image data at the outputs of the receiving units 16. These data are transmitted to the computing apparatus 17. In the computing apparatus 17, the digital image data of the entire printed product 32 are divided—into data used for colour measurement and into data used for inspection of the printed image. Where appropriate, the computing apparatus 17 additionally receives from the register sensor 18 information on the register accuracy of the printed product 32. Since register errors lead of necessity to colour errors, it must first of all be ensured, with regard to colour measurement/colour display/inking control, that the register is correct. Any required corrections of the register are carried out by the printing-press control system 21. The measured values for register adjustment are—as already mentioned made available, for example, by the register sensor 18, which is disposed in the printing press 1; or, alternatively, said measured values are supplied by a register sensor 22, which performs a corresponding measurement off-line.

Whereas, for image inspection, use is made of all the image data of the printed product 32, only certain representative regions, e.g. for each ink zone 44, are selected for inking control. Such selection is performed under computer control according to specified criteria; alternatively, it is provided that, through the intermediary of the operator apparatus 19, the printing personnel select specific measurement regions that are of decisive significance with regard to the visual sensation created by the image. Input means 25 are provided for the selection of said regions. Said input means 25 may, for example, be a keyboard, a mouse or a trackball, through which the coordinates of the relevant image regions are input, said coordinates subsequently being forwarded to the computing apparatus 17. Further provided is a display means 26, on which is displayed the instantaneously captured image of the printed product 32.

The operator apparatus 19 is connected both to the off-line measuring device 20 and also to the printing-press control system 21. Consequently, it is possible, on the basis of an okay image, to select relevant image regions within the printed product 32 and to determine therefor setpoint values that are used subsequently for the inking control of the printed product 32.

If the computing apparatus 17 detects non-tolerable colour errors in the printed product 32 or if the image inspection ascertains defective sheets that fail to satisfy the customary high standard of printing, then a corresponding signal, e.g. for a waste diverter, is output; that is, the defective sheets are separated out. Such so-called waste diverters are sufficiently known from the prior art. Reference may be made, as an example embodiment, to the waste diverter described in DE 30 29 154 C2.

Colour errors are automatically indicated and/or corrected through the intermediary of the printing-press control system 21. Other errors having a considerable influence on the print quality, such as geometrically or locally limited errors, e.g. hickies or scumming as a result of an insufficient supply of damping solution, are detected by means of a comparison of the setpoint data of the printed product 32 with the corresponding actual data of the just-produced printed product 32. If hickies occur, for example, a hickey remover is automatically activated. Likewise, if scumming occurs, the damping-solution supply is automatically readjusted. Of course, it is also possible for such corrective interventions or corrections to be performed manually.

Figure 3:
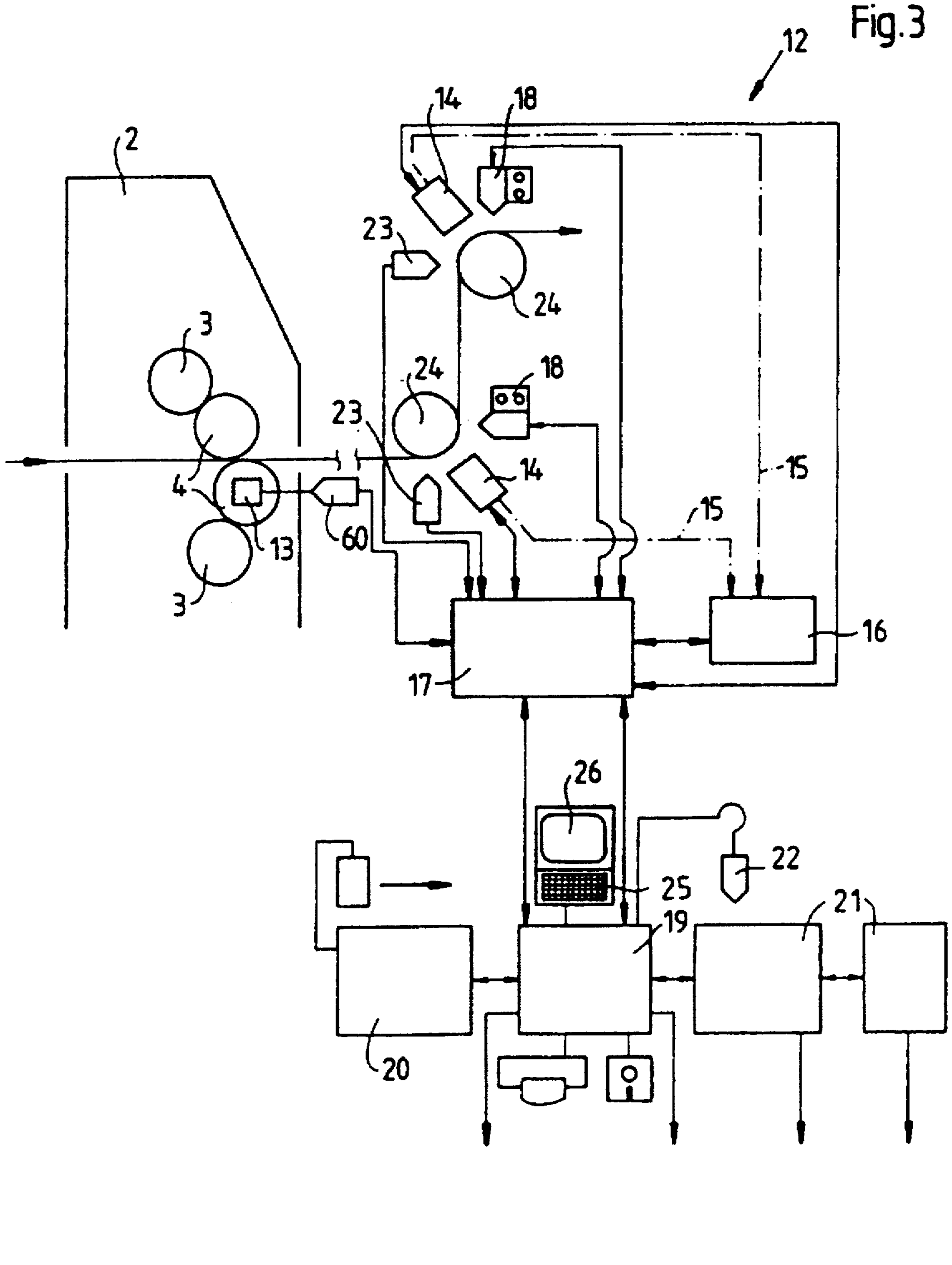
FIG. 3 shows a schematic representation of the system components of an embodiment of the device according to the invention in the case of a web-fed printing press.

FIG. 3 shows a schematic representation of the system components of the device according to the invention in the case of an offset web-fed printing press. Once again, the printing unit 2 exhibits the conventional cylinder configuration, consisting of plate cylinder 3 and rubber-blanket cylinder 4, which are each disposed on either side of the web 32 that is to be printed. A rotation-angle sensor 13 is disposed on the shaft of one of the rubber-blanket cylinders 4.

After the last printing unit 2, the web passes through a dryer apparatus (not separately shown in FIG. 3) and is then cooled through the intermediary of a cooling-roller system, consisting of a plurality of cooling rollers 24. Disposed with respect to each of said cooling rollers 24 is a measuring bar 14 with measuring modules 27, said measuring modules 27 scanning the web 32, which is printed on both sides.

The sensors 23 serve to detect the start of each image on the web 32. The signals of the image-start-detection sensors 23 and of the rotation-angle sensor 13 (which is disposed on the shaft of a cylinder 4 of the printing press 1) and of the electronic trigger module 60 are transmitted to the computing apparatus 17. In order, from the outset, to be able to rule out the possibility of colour errors as a result of register errors, register sensors 18 are disposed on either side of the web. The measured data of the register sensors 18 are likewise supplied to the computing apparatus 17, which, through the intermediary of the printing-press control system 21, initiates any required correction to the register in the individual printing units 2.

The two image-capturing apparatuses 12, which each supply image data from one side of the printed web 32, are composed of two parts: the measuring bar 14 with the measuring modules 27 and the receiving apparatuses 16.

Both parts, which are disposed separately from each other, are connected to each other through the intermediary of image conductors 15.

Image data in digital form are present at the outputs of the receiving apparatuses 16. These data are divided in the computing apparatus 17 into data for image inspection and into data for inking control. Whereas, for image inspection, all the current data of the printed product 32 are compared, by means of a setpoint-/actual-value comparison, with corresponding setpoint data of an okay image, only certain regions, e.g. for each ink zone 44, are selected for inking control. The measuring points for inking control are selected according to certain criteria. For example, it is ensured that the selected region contains four colours in as homogeneous a distribution as possible. In particular, image-determining, critical regions are used for inking control, since they decisively influence the visual sensation created by the image.

The colour data are selected either automatically on the basis of the data set of the printed image or, alternatively, they are selected "manually" by the operating personnel. For this purpose, the computing apparatus 17 is connected to an operator device 19, which, inter alia, comprises input means 25 and display means 26. Likewise, as already described in conjunction with FIG. 2, it is also provided according to this embodiment that the image-relevant regions may be selected on the basis of the data of the off-line measuring device 20. It is also possible for incorrect register settings to be detected through the intermediary of an off-line register sensor 22. In this case, the computing apparatus 17 detects both colour errors and also other errors in the printed product and initiates corresponding corrections via the printing-press control system 21.

Figure 4:
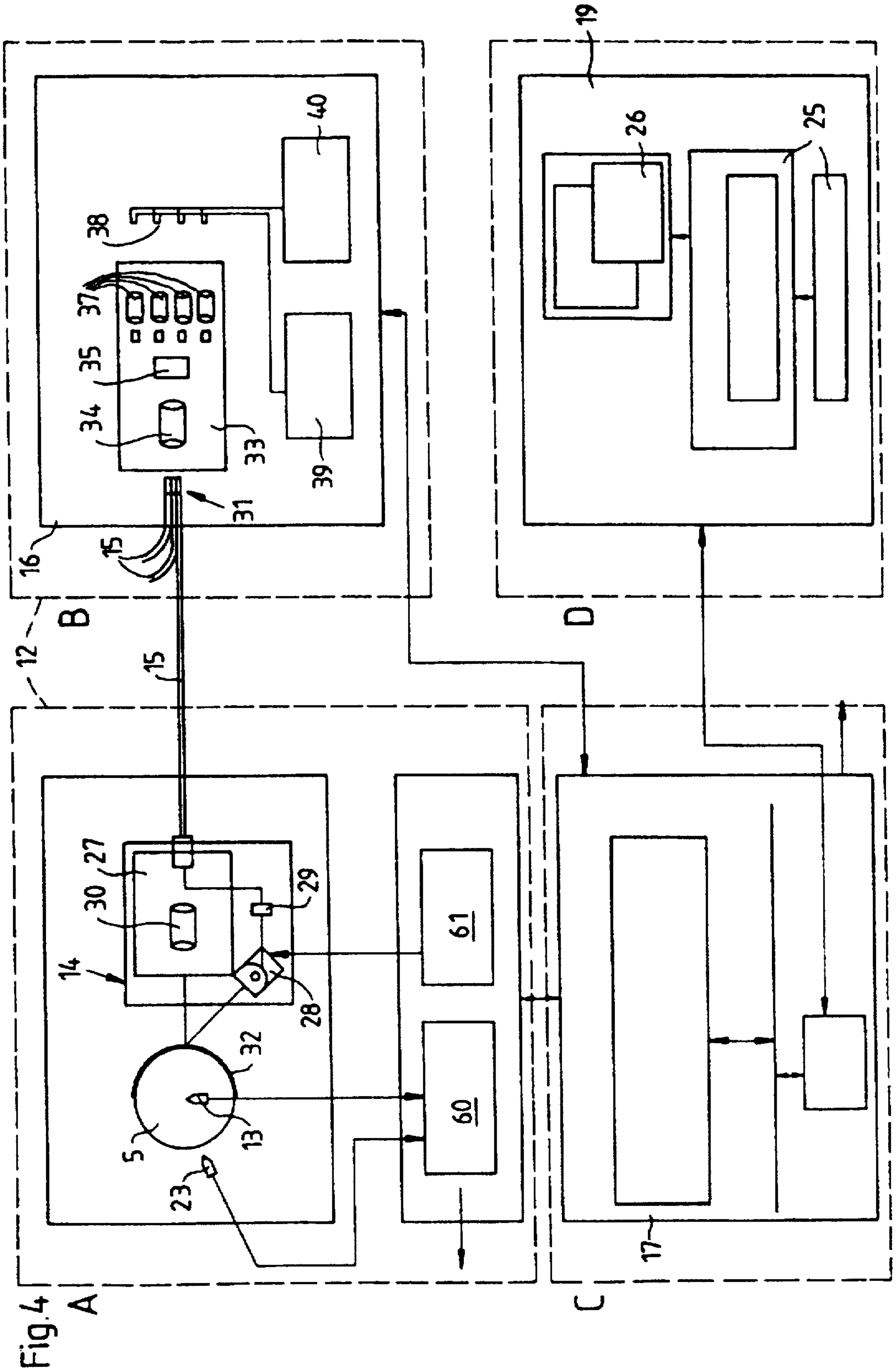
FIG. 4 shows a schematic overview of the system components of an embodiment of the device according to the invention in the case of a printing press.
Figure 5:
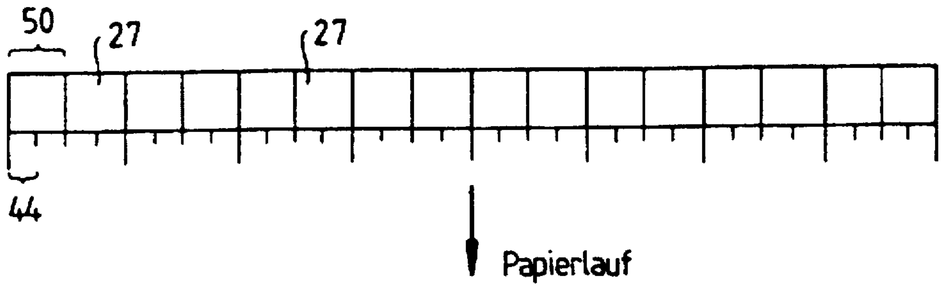
FIG. 5 shows the basic construction of an embodiment of the device according to the invention for obtaining image-inspection and colour data.

The individual system components of the image-capturing apparatus 12 according to the invention are shown in FIG. 4. The essential components are grouped together in blocks A, B, C, D. Shown in block A is the arrangement of the measuring bar 14 with respect to the surface of the impression cylinder 5 as well as the individual components contained in the measuring bar 14. Block B contains the receiving apparatuses 16 as well as the conversions of the analogue reflectance values into digital image data. The use of image conductors 15 between blocks A and B makes it possible for the measuring bar 14 to be spatially separated from the receiving apparatuses 16.

The image data are sent to the computing apparatus 17, which is accommodated in block C. Said computing apparatus 17 itself consists of a plurality of computers which divide the image data, firstly, into data for image inspection and, secondly, into data for inking control. The results of the computations performed in block C are transmitted to an operator device 19 or to a printing-press control system 21, which is accommodated in block D in FIG. 4. Said operator device 19 consists, inter alia, of input means 25 and display means 26, both the input means 25 and also the display means 26 likewise being computer-controlled.

Hereinbelow, the individual blocks A, B, C, D in FIG. 4 are explained in greater detail:

The measuring bar 14, as an essential constituent part of the image-capturing apparatus 12, is shown in block A. The measuring bar 14 consists of individual measuring modules 27, which scan the printed product 32 on the impression cylinder 5 line by line. Disposed in each measuring module 27 is an illumination apparatus 28, said illumination apparatus 28 illuminating the printed product 32 directly or indirectly. The light reflected from the surface of the printed product 32 is imaged via a front lens system 30 onto at least one image conductor 15. For the monitoring of the illumination apparatuses 28, in particular for the closed-loop control of the illumination apparatuses 28, each measuring module 27 is provided with a white-reference injector 29, which injects the radiation of the illumination apparatus 28 directly into a defined region of the image conductor 15.

In order to ensure that all illumination apparatuses 28 in the individual measuring heads 27 of the measuring bar 14 each emit the same spectral characteristics onto the printed product 32, a separate lamp closed-loop control 61 is provided. Said lamp closed-loop control 61 is either integrated directly into block A or, alternatively, just like the electronic trigger module 60, it may also be associated with the computing apparatus 17 and thus be spatially separate from the optical system in the measuring bar 14. The electronic trigger module 60 receives the signals of the rotation-angle sensor 13 and—in the case of a web-fed printing press—additionally a signal denoting the start of the respective web section. The electronic trigger module 60 associates the image data of the receiving apparatuses 16 or of the CCD line arrays 38 with their corresponding position coordinates on the printed product 32.

In the computing apparatus 17, the image data supplied from block B are divided into data for image inspection and into data for colour measurement. In the case of a two-sided print, there are two sets of data. As soon as errors are detected on the printed products 32, the computing apparatus 17 is able, for example, to output a signal for the waste diverter; that is, defective sheets or inferior folded products are automatically separated out. Furthermore, the computing apparatus 17 is connected to the operator device 19. Said operator device 19 is associated with input means 25, which permit the operating personnel to select defined image regions for inking control. Furthermore, output means 26 are provided, said output means 26 permitting, inter alia, the optical reproduction of the finished printed product 32 in real time.

Description of Individual System Components of the Device According to the Invention 1. The Measuring Bar As outlined in FIG. 9, the measuring bar 14 is of modular construction and consists of individual measuring modules 27. The individual measuring modules 27 each scan, line by line, a defined image region 50 of the printed product 32, said image region 50 comprising, in the case shown, two ink zones 44 of the printing press 1. The measuring bar 14 extends over virtually the entire width of the printing press 1.

The modular construction of the measuring bar 14 provides a plurality of advantages, said advantages being of particularly decisive importance with regard to the use of the measuring bar 14 in order to obtain image data, said image data, on the one hand, being evaluated for image inspection and, on the other hand, also being used for colour measurement, particularly for inking control. Since extremely great demands must be placed on the image data, especially with regard to colour measurement, it has to be ensured that there are identical starting conditions at all measurement sites. In particular, it must be ensured that the incident radiation intensity is identical at all measurement sites.

Owing to its modular construction, the measuring bar 14 can be positioned very close to the object plane, i.e. to the surface of the impression cylinder 5 or of the cooling rollers 24 carrying the printed product 32. Furthermore, on account of the direct closeness to the object, the measured radiation intensity at the measurement sites is sufficiently high. A further advantage of the modular construction and direct nearness to the object of the measuring bar 14 is obvious: the influence of interfering radiation is relatively slight.

However, the modular construction also provides advantages with regard to the adaptation of the dimensions of the measuring bar 14 to any pertaining widths of the printing press 1 or to different sizes of printed product. In addition, the parallel capture of image data in the individual measuring modules 27 of the measuring bar 14 and in the possibly following receiving apparatuses 16 and 38 proves to be particularly advantageous with regard to the subsequent processing of the image data: the parallel processing and/or evaluation of the image data caters excellently for the high printing speeds and therefore for the correspondingly high production of image data to be processed.

Basically, there are two embodiments of measuring modules 27 of the measuring bar 14: either each measuring module 27 contains both the optical system, i.e. the illumination apparatus 28 and the front lens system 30, and also the receiving apparatus(es) 16 or, alternatively, the optical system 28, 30 is spatially separate from the receiving apparatus 16. The connection between the measuring module 27 and the receiving apparatus 16 is then accomplished by image conductors 15.

Figure 6:
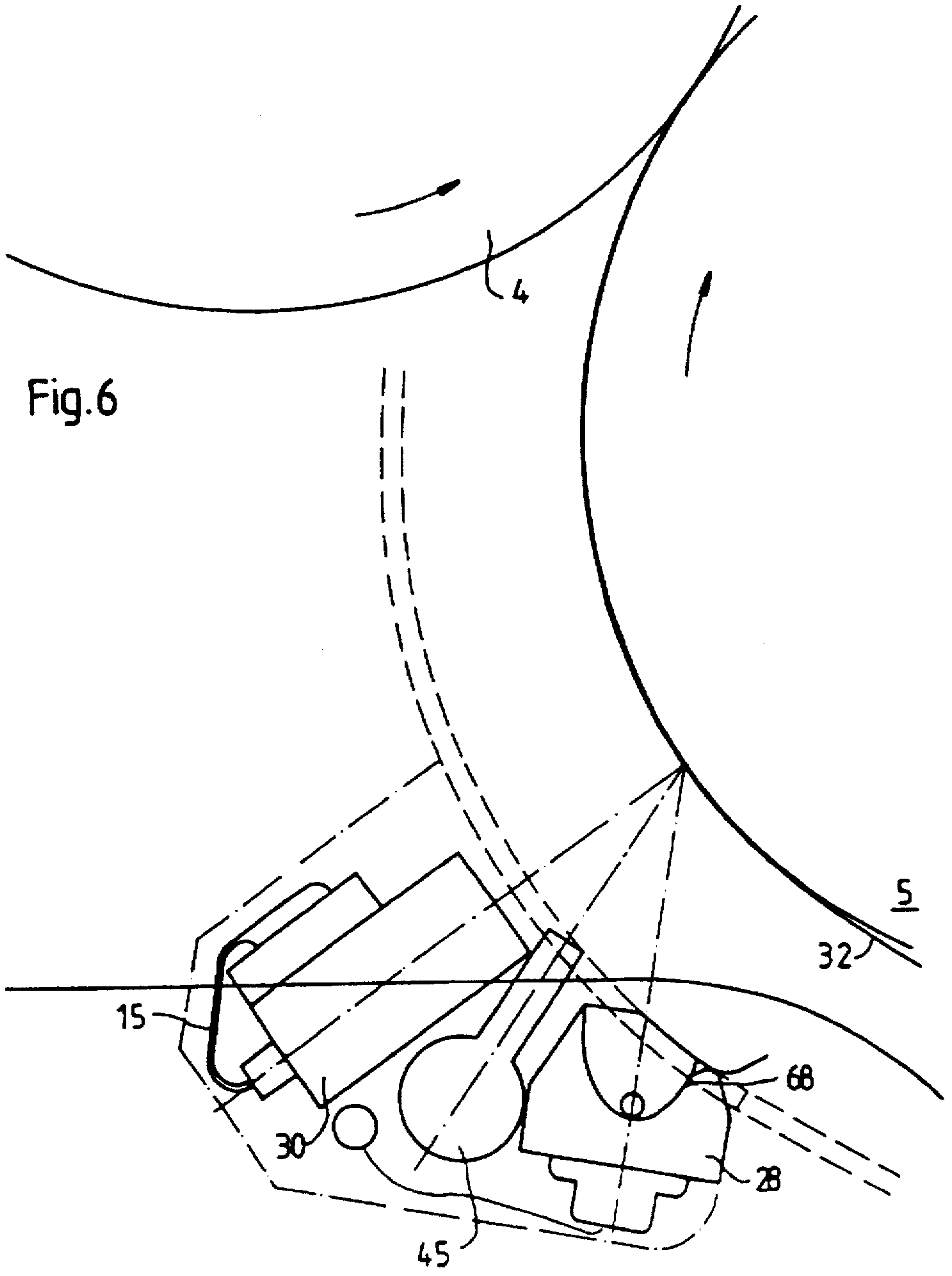
FIG. 6 shows a cross section through the measuring bar according to an embodiment of the device according to the invention.

FIG. 6 shows a cross section through the measuring bar 14 according to the second version. Merely the illumination apparatus 28 and the front lens system 30 are disposed in the measuring module 27. The measuring module 27 is connected to the corresponding receiving apparatus 16 through the intermediary of image conductors 15.

The separation of the optical from the electric or electronic components provides a plurality of advantages. Seen in purely design terms, the measuring bar 14 can be reduced in size owing to the separation of the electronic components. This results in a smaller space requirement, which is of great importance particularly with regard to installation in the printing press 1. Furthermore, with the mechanical parts separated from the electric parts, there is no possibility of the heat generated by the illumination apparatus 28 having a negative effect on the temperature-sensitive CCD elements 38 or on the electronics, particularly the A/D converter. Since, in addition, the elements of the receiving apparatus (es) 16 (which react extremely sensitively to disturbing influences) as well as the further-processing electronics are able to be disposed outside the printing press, for example under the footboard of the printing press 1, it is easily possible to keep these elements away from mechanical or electromagnetic disturbances.

It has already been described hereinbefore that, in order to obtain sufficiently precise colour measurement, the dependence of the measured values on distance and geometry should, both with regard to illumination and also with regard to observation, be minimal, ideally zero. Provided for this purpose is an oblong elliptic mirror 68, which generates a line-shaped image of the illumination apparatus 28 on the printed product 32. Owing to the favourable spectral reflection properties, the elliptic mirror 68 is either chrome-coated or, alternatively, it is made of aluminium with a silicon-oxide coating. This type of irradiation is optimally suited to the measurement task, since it is possible in this manner to achieve a highly homogeneous illumination in the defined image region 50 of the printed product 32.

In order, in addition to the homogeneous lateral distribution of intensity within a defined image region 50, also to obtain a constant distance of the printed product 32 from the measuring bar 14, a blast-air tube 45 with openings in the direction of the printed product 32 is provided inside the measuring bar 14. By means of the application of blast air, the printed product 32 is kept at a defined distance with respect to the illumination apparatus 28 and the front lens system 30. The apparatuses that supply the blast air to the blast-air tube 45 are of such design that the blast air is used simultaneously to cool the illumination apparatuses 28.

As already described hereinbefore, a homogeneous lateral distribution of the radiation within the defined image region 50 is of decisive significance with regard to the subsequent colour measurement and the subsequent inking control. In particular, it must be ensured that variations as a result of differences in illumination of the defined image regions 50 on the printed product 32 are within the allowable colour tolerances. Namely, once such variations lead to errors that exceed the colour tolerances, it is no longer possible to obtain a high-precision, defined colour measurement. Apart from the homogeneous illumination of the defined image region, therefore, it must also be guaranteed that, given a modular construction of the measuring bar 14, there is a reliable, mutually matched closed-loop control of the illumination apparatuses 28.

2. Lamp Closed-Loop Control

With regard to the illumination apparatuses 28, it must be ensured that they subject the printed product 32 to a radiation that is of a constant spectral composition with respect to time. Furthermore, the radiation intensity should be to some extent identical throughout the entire relevant wavelength range, which is between approx. 400 nm and NIR. A further requirement to be imposed on the illumination apparatuses 28 consists in that the spectrum of the radiation must be independent of the particular measurement site on the printed product 32. Only if the spectrum of the radiation is identical at all measurement sites is it possible to use the same spectral correction function, i.e. the same colour filter 36, for all measurement sites.

Consequently, it is advantageous to employ precision halogen lamps as the illumination apparatuses 28, one precision halogen lamp being provided for each measuring module 27. In order, in the case of a centric arrangement (centralized in the selected region) of the illumination apparatuses, to obtain comparable illumination also in the two edge zones of the printed product 32, two further precision halogen lamps are disposed on left and right in the edge regions of the measuring bar 14. In order to prevent the stray light from adjacent illumination apparatuses 28 from falsifying in uncontrolled manner the measurement results within a defined image region 50, stops are provided in the optical path, said stops being so disposed that only the defined image region is illuminated by the illumination apparatus 28 of the associated measuring module 27.

The precision halogen lamps are balanced with respect to each other by separate programmable precision power sources, the power sources being controlled by field-effect transistors. The lamp closed-loop control 61 is accomplished on the basis of the colour temperature of the individual illumination apparatuses 28.

The construction of a lamp closed-loop control is shown in FIG. 7*a*. The light of an illumination apparatus 28 is coupled onto a light guide 64, the output of which is connected directly to the input of the corresponding image conductor 15. The radiation from each of the light guides 64 passes through the associated optical system 33 as far as the receiving apparatuses 16 and 38. Since the light is measured in each of the spectral channels, a vector of discrete values is provided for each illumination apparatus 28. Said vector is normalized with the corresponding measured values of a standard light source 47. The change of the normalized measured values is correlated with the temperature T. In particular, the normalized measured values can be plotted against the corresponding colour channels. To a first approximation, the relative intensities change as a function of temperature T. Consequently, the current of the associated illumination apparatus 28 is controlled through the intermediary of an inverting amplifier 69. The lamp closed-loop control 61 ensures that each of the illumination apparatuses 28 emits radiation of equal intensity throughout the entire relevant spectral range.

It is advantageous for the light guide 64 to be disposed in a hole 70, the axis of said light guide 64 being directed at the illumination apparatus 28. Furthermore, the light guide 64 is adjustable inside said hole 70.

FIG. 7b shows a cross section through one of the image conductors 15, showing in particular the injection region for the monitoring of the illumination apparatus 28 or for the calibration to the absolute white or the calibration white 47. The image conductor 15 consists of a multiplicity of bundled light fibres 49. Provided on one side of the image conductor 15 is a region for injection of the radiation of the light guide 64 or for calibration to the calibration white 47.

The instantaneous value (measured and averaged in each colour channel) of each illumination apparatus 28 (white value) is used for the normalization of the measured colour values; subtracted therefrom is the instantaneously averaged dark current of the CCD lines 38. This measure results in a correction that is of great importance with regard to reliable colour measurement.

The correction can be described by the following formula:

$$Y_n = \frac{\frac{1}{i_{max}} * \sum_{i=1}^{i_{max}} Y_i - \overline{Y_{Dark}}}{\overline{Y_{White\ value}} - \overline{Y_{Dark}}}$$

$$\overline{Y_{White\ value}} = \frac{1}{j_{max}} \sum_{j=1}^{j_{max}} Y_{White\ value}$$

$$\overline{Y_{Dark}} = \frac{1}{j_{max}} \sum_{j=1}^{j_{max}} Y_{Dark}$$

where Y denotes the measured values of the Y channel; i the number of pixels of a coherent colour measurement area; $Y_{White\ value}$ the white value of the illumination apparatus 28 and $Y_{Dark}$ the dark current of the CCD lines 38.

3. Measuring-Bar Protection with Calibration Function

For inking control according to colorimetric variables, it is indispensable that the image-capturing apparatus 12 should be calibrated to an absolute white or a calibration white 47. The absolute white 47 is, according to DIN, barium sulphate, which, however, because of its consistency (usually in the form of a compacted powder tablet), is hardly suitable for in-line use. Used as a substitute substance, therefore, is a tile whose optical properties are known in relation to barium sulphate. The calibration white 47 must be of such dimensions that it can be measured by each illumination apparatus 28. Thus, according to one embodiment, it is proposed that the calibration white 47 is situated on the surface of the cylinder 5 or, alternatively, that the calibration white 47 is accommodated on a separate carrier in the cylinder gap of the respective cylinder 5, 24. In particular, it must be ensured that the distance between illumination apparatus 28 and calibration white 47 is the same as the distance between illumination apparatus 28 and defined image region 50 on the printed product 32. Usually, calibration of the image-capturing apparatus 12 is carried out during breaks in printing. If the calibration white 47 is accommodated in the cylinder gap of the cylinder 5, however, calibration may also be performed during the printing process in the case of a sheet-fed printing press.

Figure 8A:
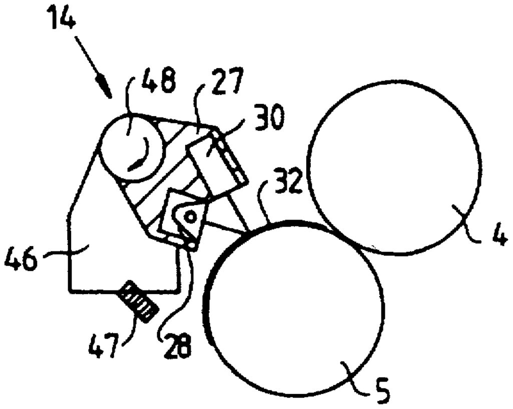
Figure 8B:
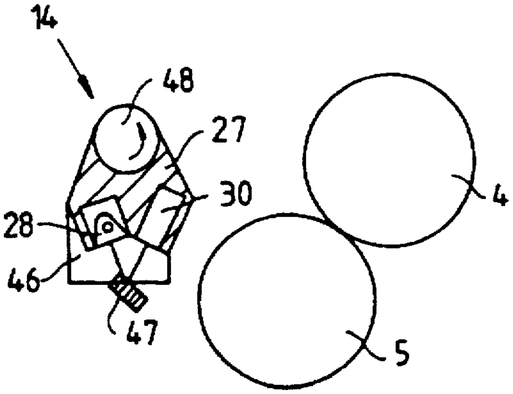

A particularly advantageous embodiment with regard to the calibration of the image-capturing apparatuses 12 or of the measuring modules 27 can be implemented as follows. This embodiment is shown in FIG. 8a) and 8b). The measuring bar 14 with the measuring modules 27 is disposed opposite the impression cylinder 5. The measuring bar 14 is associated with a protective housing 46. Measuring bar 14 and protective housing 46 have a common shaft, a so-called mounting tube 48. The measuring bar 14 is swivellable about the shaft and is lockable in two positions, a measuring position (FIG. 8a) and a parked position (FIG. 8b). In the measuring position, the printed product 32 on the impression cylinder 5 is scanned. Illumination apparatus 28 and front lens system 30 are disposed at an angle of approx. 45°. It is advantageous for the radiation of the illumination apparatus 28 to strike the surface of the printed product 32 at an angle of 45°.

During breaks in printing, the measuring bar 14 is swung into the parked position, in which it is situated inside the protective housing 46. The fact that the measuring bar 14 is swung into the protective housing 46 provides a plurality of advantages. For example, the swinging-away of the measuring bar 14 creates space in the region of the cylinders 4, 5 of the printing unit 2. Consequently, the cylinders 4, 5 are made more freely accessible, which proves advantageous once the cylinders, particularly the rubber blanket of the rubber-blanket cylinder 4, need to be cleaned. Furthermore, the fact that the measuring bar 14 is swung into the protective housing 46 means that the illumination apparatuses 28 and the front lens systems 30 are protected against impurities. In particular, none of the washing agent used to clean the rubber-blanket cylinder 4 during breaks in printing is able to reach the optical components.

The following embodiment is to be viewed as being particularly advantageous. In said embodiment, the calibration white 47 is disposed inside the protective housing 46 in such a manner that it can be measured with the measuring bar 14 in the parked position in the protective housing 46. The optical intersection point of the respective illumination apparatus 28 and the front lens system 30 now lies on the surface of the calibration white 47. It must merely be ensured that the dimensioning of the protective housing 46 is such that the distance between the illumination apparatus 28 and the calibration white 47 in the parked position is identical to the distance between the illumination apparatus 28 and the measurement site on the printed sheet 32.

FIG. 9 shows a schematic representation of a first embodiment of the device according to the invention. Each measuring module 27 of the measuring bar 14 scans a defined image region 50 on the printed product 32 line by line. In the case shown, the defined image region 50 comprises two ink zones 44. The image-information-carrying radiation of the illumination apparatus 28 (not separately shown) reflected from the surface of the printed product 32 is imaged by the front lens systems 30 onto the corresponding image conductor(s) 15. The image conductors 15, disposed in parallel at the image end, are stacked at a defined interval one on top of the other at the receiving end. Advantageously, the stacked image conductors 15 are grouped together at the receiving end to form a randomly variable plug-in connector 31.

The image-conductor ends, stacked at a defined interval one on top of the other, are then imaged onto the receiving apparatuses 38 via an optical system 33, consisting of receiving lens system 34, colour-beam divider 35 and colour filters 36. The colour filters 36 are colour filters that, in the case shown, for example, simulate the X, Y and Z regions for colour measurement according to the three-region method (DIN 5033) as well as a filter that blocks out from the spectrum of the measuring radiation a region in the near infrared (NIR) for the separate measurement of printer's black. Both the beam divider 35 and also the colour filters 36 are of such design that a high light sensitivity with good optical imaging properties is obtained in each of the three colour channels X, Y, Z.

In order to guarantee comparable filter characteristics for all image points, the colour filters 36 are disposed in the parallel optical paths of two lens systems, this ensuring that the colour filters 36 are always traversed perpendicularly by the radiation. This measure proves to be extremely advantageous with regard to reliable colour measurement and inking control.

The fact that the image-capturing apparatus 12 is split up into a measuring bar 14, carrying individual measuring modules 27, and a receiving apparatus 16 means that the sensitive sensors as well as the further-processing electronics of the image data are spatially remote from the measurement site. In this way, the thermal loading at the measurement site, caused of necessity by the illumination apparatuses 28, is unable to have a negative impact on the temperature-sensitive elements, particularly on the A/D converter and the CCD elements 38.

Moreover, the modular optical path, composed of image conductors, ensures that the optical components can be kept as small as possible. Thus, firstly, the lens systems at the measurement site are only slightly larger than the image conductors at the measurement-site end; therefore, they are light and permit a slim construction of the measuring bar. Secondly, the image conductors at the receiving end are able to be so tightly stacked that the overall stack is of rectangular, and—particularly advantageously—of virtually square, form. Such an arrangement means that the lens systems at the sensor end can likewise be kept small, this permitting a low-cost insulation against vibration. Furthermore, the sensors themselves can also be kept small, with the result that they can be cooled by simple means.

The image conductors 15, which transmit the radiation reflected by the printed product 32 from the selected regions 50, are either of single-layer or multi-layer design. Each image conductor 15 itself is composed of a multiplicity of juxtaposed and, where appropriate, stacked light fibres 49, which are arranged in such a manner that a geometrically undisturbed image transmission is guaranteed. Each single- or multi-layer multiple image conductor 15 is normally composed of a plurality of stacked layers, it normally being the case that one layer is provided for each colour channel.

A particularly advantageous embodiment of an image conductor 15 is represented by a so-called multi-layer "single image conductor", the individual layers being stacked at the input end and being split at the receiving end and imaging the selected image region 50 directly onto correspondingly associated CCD lines 38. With regard to the stacking of the image-conductor ends to form a plug-in connector, there are basically two possibilities:

1. The individual image conductors, which transmit the radiation from the defined image region 50, are stacked one on top of the other; that is, each plug-in connector 31 is composed of stacked image conductors 15. Subsequently, the radiation present at the output of the plug-in connector 31 is transmitted via a beam divider 35 and corresponding colour filters 36. The advantage of such an embodiment lies in the fact that the measuring light of each multi-layer single image conductor 15 stems from precisely the same defined image region 50.
2. A second possibility for the stacking of the image-conductor ends provides that the individual colour channels of all image conductors 15 are each grouped into blocks, which then, in turn, are stacked to form a plug-in connector 31. With this type of arrangement, it is possible to dispense with the following beam division—and thus with the beam divider 35. However, this solution has the disadvantage that the measuring light in the individual colour channels does not stem precisely from the same image regions 50.

FIG. 11 shows a geometrical and optical design of the image-transmission link according to the device according to the invention. Via a front lens system 30, a defined image region 50, which, in the case shown, comprises two ink zones 44, is imaged onto an image conductor 15. A white reference 29 is separately injected onto the image conductor 15. More detailed information with regard to said white-reference injection 29 was given in conjunction with FIG. *7a*) and *7b*). The image conductor 15 consists of juxtaposed and stacked light fibres 49, which are arranged in such a manner that a geometrically undisturbed image transmission is guaranteed; that is, defined regions of the image conductor 15 each transmit the image of a specific part-region (image point) 1, . . . , N of an ink zone 44.

The parallel-disposed image conductors 15 are stacked at defined intervals one on top of the other at their output end. The image conductors 15 form a regular layer structure in the plug-in connector 31. Said plug-in connector 31 is of such design that any number of image conductors 15 can easily be joined together. The ends of the image conductors 15 are imaged, via an optical system 33, onto a structure of stacked CCD lines 38, said structure being optimally adapted to the regular layer structure of the plug-in connector 31. Available at the output of the two-dimensional CCD array 16 are data that are subsequently used by the computing apparatus 17 for image inspection and colour measurement.

In order to ensure that the stacked ends of the image conductors 15 in the plug-in connector 31 are reliably matched to the CCD line arrays 38, an opto-mechanical coupling member 52 is advantageously disposed between the plug-in connector 31 and the optical system 33. Said opto-mechanical coupling member 52 is described in greater detail in FIG. 12.

The ends of the image conductors 15 are disposed in the plug-in connector 31. Via the optical system 33, the image-information-carrying ends of the image conductors 15 are imaged onto the CCD line arrays 38, the ends of the image conductors 15 acting as image stops. In the case of a single-layer single image conductor 15, a narrow strip of the printed image is captured, said narrow strip being imaged via the optical system 33 onto the CCD line arrays 38. Division into the individual colour channels is accomplished by means of a beam divider 35, which is disposed in the optical system 33. As already described hereinbefore, the beam divider 35 may under certain circumstances be dispensed with in the case of a multi-layer single or multiple image conductor 15. In this case, each individual layer of the image conductor 15 is imaged, via a corresponding colour filter 36, onto a corresponding CCD line array 38.

The coupling member 52 is proposed in order to match the geometries of the image-conductor ends, stacked in the plug-in connector 31, to the geometries of the CCD lines or CCD line arrays 38. Said coupling member 52 consists of a front block 53 and a rear-side block 55, said two blocks being connected to each other through the intermediary of light guides 54. While the front block 53 is matched to the geometry of the image-conductor stack, the rear-side block 55 has the geometry of the CCD line arrays 38. The coupling member 52 is easier to manage from the manufacturing viewpoint than the relatively long image conductors 52, which connect the measuring bar 14 to the receiving unit 16. Furthermore, owing to the optical laws of imaging, the geometry of the CCD line array 38 is connected with the geometry of the image-conductor stack (plug-in connector 31) through the reproduction scale of the optical system 33. These three components, therefore, represent a coupled system with respect to their geometrical dimensions. Since, in general, there is no guarantee that the geometrical dimensions of the three components 31, 33, 38 will match each other—for example, there may, for technological or economic reasons, be upper or lower limits with regard to the dimensioning of said components, or it may be economically advisable not to specify the plug-in connector 31 in the size matching the imaging but to make it bigger—the coupling member 52 proves to be extremely worthwhile and useful.

Outlined in FIG. 10*a*), 10*b*) and 10*c*) is an already described quadruple image conductor according to an embodiment of the device according to the invention. FIG. 10*a*) shows a side view of the quadruple image conductor. The front lens system 30 images the defined image region 50 onto the image conductor 15, said image conductor 15 consisting of a plurality of layers, this resulting in four narrow strips of the printed image 32 being imaged simultaneously onto the image conductor 15. The ends of the image conductors 15 are stacked one on top of the other into a plug-in connector 31 in the aforedescribed manner and are then imaged via an optical system 33 onto correspondingly disposed CCD line arrays 38.

FIG. 10*b*) shows a cross section of the quadruple image conductor in direction A from FIG. 10*a*). The image conductor 15 consists of a plurality of layers spaced apart at precisely defined intervals. The image-conductor layers themselves are each composed of a multiplicity of juxtaposed light fibres 49, said light fibres 49 being disposed in such a manner that an optimal image transmission is guaranteed.

Figure 10C:
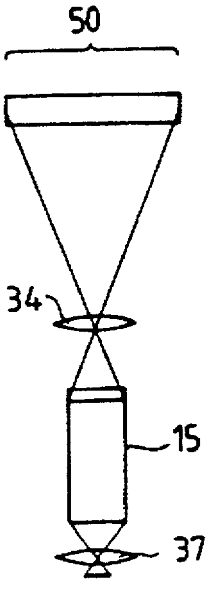

FIG. 10*c*) shows the optical path in the case of a quadruple image conductor. The defined image region 50 is imaged, via a front lens system 30, image conductor 15 and an optical system 33, onto the CCD line array 38 with a defined reproduction scale.

As already mentioned more than once hereinbefore, some embodiments of the device according to the invention require a beam divider 35 to be provided in the optical system 33, said beam divider 35 dividing the radiation coming from the defined image regions 50 into individual colour channels X, Y, Z and IR.

FIG. 13*a* shows a side view of such a beam divider 35. The image conductors 15, stacked one on top of the other at the receiving end, carry the image information from the individual measured regions. The radiation transmitted by the image conductors 15 is split into a plurality of channels. Thus, disposed in front of the actual receiving lens system 34 is a cut-off filter 71, which blocks out an IR channel and images it onto a CCD line 38. The remaining radiation is split into an X, a Y and a Z channel and is imaged via colour filters 36 and corresponding lens systems onto the associated CCD lines 38.

FIG. 13*b* shows a side view of a further embodiment of a beam divider 35. The image conductors 15, stacked one on top of the other at the receiving end, carry the image information from the individual measurement regions of the selected region 50. The beam divider is of such design that it splits the radiation transmitted by the image conductors 15 into the three colour channels (X, Y, Z) and the IR channel. The radiationfrom the individual colour channels is imaged via corresponding colour filters 36 or an NIR filter 36 onto correspondingly associated CCD lines 38.

FIG. 14 shows the measuring geometry and the optical path in a measuring module 27. From an illumination apparatus 28, the radiation passes through imaging optics 56 before striking the selected defined image region 50 of the printed product 32. The angle of incidence of the radiation is 45°. The radiation reflected from the printed product is imaged via a receiving lens system 57 onto a receiving apparatus 16. The receiving apparatus 16 observes the defined region 50 of the printed product 32 at an angle of 0°.

FIG. 15 shows a first embodiment of a measuring module 27 with integrated receiving apparatus 16. From the illumination apparatus 28, the radiation strikes the defined region 50 of the printed product 32 via a shape converter 73 and a cylindrical mirror 72. The radiation has an angle of incidence of 45°, whereas the observation takes place perpendicularly to the measurement plane. The radiation reflected from the defined image region 50 is split by a beam divider 35 into individual colour channels. Via colour filter 36 and a receiving lens system 34, each colour channel is imaged onto a CCD line 38. The normally likewise provided NIR channel for measurement of the black component has not been separately shown in FIG. 15.

It has already been mentioned hereinbefore that the CCD lines, just like the further-processing electronics, react very sensitively to fluctuations in temperature. Since, in the example shown, the measuring module 27 contains both the optical and also the electronic elements, a cold-light source is used for illumination, the light being directed from an illumination apparatus 28 via a shape converter 73 (optical system of light guides) onto the cylindrical mirror 72.

FIG. 16 shows a further embodiment of a measuring module 27 with integrated receiving apparatus 16. The construction is similar to that shown in FIG. 16, but it has been optimized with respect to the channel geometry. From an illumination apparatus 28 (which is, once again, a cold-light source), the radiation is directed via a shape converter 73 directly onto the defined image region 59 of the printed product 32. Once again, the radiation from the defined image region 50 of the printed product 32 is measured in colour-measuring channels X, Y, Z at different angles. In particular, the Z channel is perpendicular to the measurement plane. Since the spectral sensitivities of Z channel and NIR channel have no overlap region, but lie far apart, this channel is provided with a colour divider 74. Said colour divider 74 lets through the spectral range belonging to the Z channel, while the above-lying spectral range is reflected onto the NIR channel. The defined image region 50 is imaged onto the CCD line arrays 38 via colour filters 36 and receiving lens systems 34.

The construction of a measuring module 27 according to FIG. 16 has proved to be particularly advantageous in order to counter the falsification of the measured values by the fact that the radiation reflected from the printed product 32 normally exhibits a peak in the direction of the specularly reflected radiation component. The surface of the printed product 32, therefore, is not normally an ideally scattering surface that scatters the radiation with equal intensity into all solid-angle regions. Rather, the intensity of the radiation reflected from the surface of the printed product 32 is angle-dependent. The causes of the increased radiation intensity in the direction of the specularly reflected radiation component are to be found in the quality of the paper, the ink density, the area coverage and the type of printing ink.

A further falsification of measured values as a consequence of an increased radiation intensity in the direction of the specularly reflected radiation component is caused by the fact that the freshly printed sheets may still not be entirely dry. In order to prevent the falsification of measured values through moisture on the surface of the printed product 32, it is provided that polarization filters 75 are inserted into the optical path.

FIG. 17 shows a further embodiment of a measuring module 27, the representation being limited to the receiving apparatus 16 for the radiation. The radiation reflected from the selected region 50 of the printed product 32 is imaged via colour filter 36 onto a lens array 76. In each case, one pixel of the defined image region 50 is received by the lens array 76 and is then imaged via light fibres 54 and an imaging system 33 onto the adjustable CCD receiving elements 38. This fibre-optic embodiment of the measuring module 27 also makes it possible, in particular, to employ individual light fibres 54 for the injection of the reference value (white reference of the illumination apparatus 28 or, alternatively, the calibration-white reference). Furthermore, the glass-fibre bundle allows problem-free matching of geometry between the defined image region 50 and the receiving apparatus 38.

FIG. 18 shows a further embodiment of an image-capturing apparatus 12. Once again, the optical system, particularly the illumination apparatus 28 and the front lens system 30, and the receiving apparatus 16 are positioned in a measuring module 27. The illumination apparatus 28 (not shown) illuminates the defined image region 50. An intermediate image is generated through the intermediary of the front lens system 30, said intermediate image being imaged via a further optical system 33 onto a CCD line array 38. The optical system 33 comprises an image-end lens system and a receiving-end lens system, positioned at the common focal point of which is a partial filter 66. The 4-f arrangement eliminates the location-dependence of the radiation between the lens systems, this allowing the use of a partial filter 66. The use of a partial filter 66, inserted into the optical path at the receiving end, provides a plurality of advantages:

- preciser matching is made possible;
- it is possible to obtain higher transmission rates;
- through the use of two-stage imaging, it is possible freely to select the size of the intermediate image. Consequently, the receiving-end imaging can always be dimensioned such that the required reproduction scale is produced.

In order to rule out uncontrollable colour-measuring errors, it is necessary—as already mentioned hereinbefore—for the radiation to traverse the filter perpendicularly. Otherwise, the spectral transmission is a non-linear function of the angle of incidence. The consequence of this is that the spectral characteristics of the filter after normalization are not consistent with the normal-spectral-value function X, Y, Z—i.e. the colour measurement is made angle-dependent. In order to rule out the possibility of such errors, the aforementioned succeeding 4-f arrangement of the lens systems is chosen.

A partial filter 66 normally consists of a neutral glass onto which a multiplicity of different colour filters 36 are cemented. The resulting spectral characteristics are the product of the interaction of the individual part-filters of the partial filter 66. Through the additional use of stops and masks it is possible for portions of the individual part-filters to be switched on or off in defined manner, with the result that the spectral characteristics can be selectively influenced.

FIG. 19 shows a further embodiment of the device according to the invention. In this embodiment, the receiving apparatus 38 may either be integrated in the measuring module 27 or, alternatively, both may be disposed separated from each other via image conductors 15.

The radiation reflected from the selected region 50 of the printed product 32 is directed via a front lens system 30 and a slit 79 and from there via a lens, e.g. a cylindrical lens 80, onto a prism 78 or grating. The prism 78 disperses each measured point of the selected region 50 into a spectrum. The receiving apparatus 38 consists, for example, of an in-line CCD element, the number of CCD elements corresponding to the number of support points in the spectrum. Since each measured point of the selected region 50 is dispersed into a spectrum, it is advantageous for the receiving apparatus 38 to consist of a CCD array, the number of lines of which corresponds to the number of support points in the spectrum and the number of slits of which corresponds to the number of measurement sites within the selected region 50. In order to obtain a higher processing speed, the CCD array may consist of a plurality of CCD lines, the individual CCD lines being read in parallel. With this locally resolved spectrometer camera, therefore, it is possible to obtain both a spectral and also a spatial resolution.

A disadvantage of this embodiment in relation to the aforedescribed devices is the increased number of CCD elements. However, this additional outlay is compensated for by a reduced resolution with regard to the digitization of the data. Whereas, with the aforedescribed embodiments, 12-bit data must be available for reliable colour measurement, the same result can be achieved in this case with, for example, 8-bit image data.

A further advantage of this embodiment consists in the fact that the spectral, digital image data can be matched to any desired filter function by being weighted with a corresponding factor. This simulation of any desired filter functions (X, Y, Z or RGB) in the digital range makes it possible to dispense with the need for the conventional "hardware" filters. Whereas, with the use of filters 36, it must always be ensured that there is both a homogeneous illumination of the selected region 50 and also a well defined object distance, such things are considerably less important in the case of the embodiment described with reference to FIG. 20.

There follows a more detailed description of the individual system components of the image-capturing apparatus 12 shown in FIG. 4.

As already described in detail hereinbefore, the receiving apparatus 16 consists, inter alia, of the CCD line array 38. Said CCD line array 38 consists of CCD lines associated with the individual colour channels with corresponding driving electronics 40. Each of the CCD lines 38 is accommodated on an adjustable and replaceable chip carrier, said chip carrier further containing clock drivers and video preamplifiers (not separately shown). The driving electronics 40 for the four CCD line arrays 38 (X, Y, Z, NIR) execute the conventional physical process of signal formation within a CCD line 38. The process comprises the following steps: generation of the charges; charge transfer; charge detection and amplification. Subsequently, there is double-correlated scanning of the amplified signal. The signal is converted, for example by means of a 12-bit A/D converter 39, into a digital image. The electronic trigger module 60 guarantees the synchronization of the image-capturing apparatus 12 with the angular position of the printing unit 2. The pulse train from a rotation-angle sensor 13, particularly an incremental sensor, is used both to determine the angular velocity of the cylinder 5 and also to generate the integration clock for the CCD lines 38 as a function of the measured printing speed.

Reliable synchronization with regard to the accurately timed reading of the image data of the receiving units 16 requires precise knowledge of the angular intervals between the increment marks of the respective incremental sensor 13. For this reason, the time interval between two increment pulses is derived on the basis of the current speed, the diameter of the impression cylinder 5 and the thickness of the printed product being processed, in order to determine the speed of the printing press 1.

The image data of the receiving apparatuses 16 are forwarded to the computing apparatus 17. The computing apparatus 17 processes the image data in real time.

Owing to the (depending on the printing speed) very high amount of image data produced, there is a need for a multi-stage data reduction. The following functions are implemented in the computing apparatus 17:

- storage of the setpoint image;
- management of a parameter image with control information for definition of the image size, of weighting functions for evaluation of image errors and of the image regions in which colour measurements are to be performed;
- accumulation of scanning lines in the measuring lines;
- storage in the form of a list of the image points of the digital image relevant for colour measurement and shading measurement;
- high-speed transfer of image data via a pipeline bus;
- accumulation of the differential images;
- synchronization of the CCD lines;
- parallel evaluation of the current and the accumulated differential image with differently adapted thresholds;
- error preprocessing for image inspection in real time.

The computing apparatus 17 consists of a plurality of hardware components:

- a module in charge of signal conditioning (shading correction, grouping of scanning lines into measuring lines);
- a memory for data in which the measured values for colour measurement/inking control can be stored;
- a control circuit that sorts measured data for colour measurement/inking control in the aforedescribed memory depending on the contents of a parameter memory;
- a module principally for image inspection that contains setpoint-image memories, parameter memories and accumulating differential-image memories and that is further capable of forming weighted differences as a function of the parameter memory, both for the current differential image and also for the accumulated differential image;
- a circuit that switches a hardware signal in the case of overstepping of a tolerance, said signal serving, for example, for the real-time control of a waste diverter; and
- a module containing a CPU that controls communication with higher-ranking modules or that is able to access the above measured-colour-values memory in order to calculate further derived data from the "raw" data. The computing apparatus 17 has a plurality of defined interfaces that permit communication with the printing-press control system 21, the input apparatus 19 and the off-line measuring device 20.

The processing of the image data in real time means that an operation has always been completed by the time the same operation is again up for processing, for example on a cyclical basis. Hence, a differential image is generated in real time when the differential image from the current image and the static, predetermined setpoint image has been calculated before the next current image is available. The same applies to the evaluation of the measured colour data. The evaluation of the measured colour data takes place in real time when, likewise, the evaluation has been completed before the corresponding data set of the next image is up for processing. The processing frequency is, therefore, directly coupled to the cyclical printing of the printed products 32 and thus to the speed of the printing press 1. Since both image inspection and also colour measurement are performed in real time, the just-produced printed product 32 can be evaluated according to whether its print quality is sufficient or not. Suitable corrective measures can be initiated instantaneously, with the result that the printing of defective sheets is reduced to a minimum. The arising quantity of data or the data rate is dependent on the pixel size, the size of the printed image 32 and the speed of the printing press 1. The computing apparatus 17 must be matched to said quantity of data with regard to memory requirement and processing speed. In particular, the memories (not separately shown in the drawings) must be of such design that a plurality of mutually independent sets of image data can be stored in them.

According to the invention, image inspection is performed on the basis of the image data of the entire printed product, inking control being performed on the basis of selected image regions. With regard to image inspection, an inspection is performed in the accumulated differential image, said inspection detecting, in particular, printing defects that are constant with respect to time. An evaluation of the defect characteristics is derived on the basis of the results in the current differential image and in the accumulated differential image. This makes it possible, in particular, to differentiate between statistical defects and defects that have a serious impact on the print quality, such as hickies.

The above circuit with computing apparatus 17 connects together the data of a preferably coherent, print-quality-determining region of each ink zone 44. In the case of closed-loop colorimetric control, the actual colour locus of said region is determined and is compared with a corresponding stored setpoint colour locus. An embodiment of such a closed-loop colorimetric control is, as mentioned hereinbefore, described in EP 0 324 718 A1. In the event of a colour difference between actual colour locus and setpoint colour locus, the corresponding film-thickness changes in the corresponding ink zones 44 of the individual printing units 2 are calculated. The corresponding setting data for the ink actuators are sent via a printing-press control system 21 to the respective printing units 2. A corresponding printing-press control system 21, serving in particular for the closed-loop control of the ink actuators of a printing press 1, is known from EP 0 095 649 B1. A printing-press control system 21 on the printing press 1, serving, for example, for the automatic positioning of a hickey remover, is described in DE 37 08 925 A1. These two publications are to be viewed as integral constituent parts of the present patent application.

We claim:

1. Device for the image inspection of a printed product, comprising:

an image-capturing apparatus delivering image data for reproducing the entire surface of the printed product;

said image-capturing apparatus containing an illumination apparatus, said illumination apparatus illuminating a narrow strip of an image region to be inspected with homogeneous brightness in the longitudinal direction of the strip;

said image-capturing apparatus further containing a photoelectric receiving element, said receiving element picking up light reflected from the image region under inspection, evaluating the light with the aid of spectral filters and converting it into electric signals;

a computing apparatus being connected to said image-capturing apparatus in order to process the image data;

image conductors having a multiplicity of ordered light-conducting fibers provided in said photoelectric receiving element, said image conductors having light-entry surfaces in the form of narrow strips which pick up the reflected light without gap across the entire width of the printed product (32);

said light-entry surfaces being uniformly distributed in zones (44, 50) and being disposed along a line lying parallel to the illuminated strip on the printed product (32);

said light-entry surfaces of said image conductors (15) each being formed of narrow strips and being rectangular, parallel and stacked one above the other at equal intervals;

a front objective lens being disposed in front of each of said narrow strips for imaging the light from one image element onto said multiplicity of ordered light conducting fibers (49);

an optical imaging system (51) located between said image conductors (15) and said photoelectric receiving element for imaging the light, distributed over said multiplicity of ordered light conducting fibers, from said one image element onto a part region of a row of said photoelectric receiving element (38); and said image conductors having light-exit surfaces such that image information leaving said light-exit surfaces is imaged onto an arrangement with in-line, parallel and equally spaced said receiving elements (38); each line of said receiving elements (38) being associated with precisely one strip of said light-exit surfaces of said image conductors (15).

2. Device according to claim 1, wherein the image conductors (15) are joined together at the receiving end to form an optical plug-in connector (31), the light-exit surfaces lying more or less in one plane.

3. Device according to claim 2, wherein the photosensitive elements (38) are preceded by an optical system (33) consisting of lens systems (34, 37) and colour filters (36), which image the outputs of the plug-in connector (31), corresponding to the colour channels of the individual measuring modules (27), onto a corresponding number of receiving apparatuses (16).

4. Device according to claim 2, wherein the outputs of the optical plug-in connector (31) are imaged via an optical system (33) onto at least one receiving apparatus (16).

5. Device according to claim 4, wherein a coupling member (52) is provided between the plug-in connector (31) and the receiving apparatus (16), said coupling member (52) opto-mechanically adapting the geometrical dimensions of the stacked outputs of the image conductors (15) to the geometrical dimensions of the receiving apparatus (16) or of the CCD line array (38).

6. Device according to claim 5, wherein the coupling member (52) consists of a front block (53), corresponding to the geometrical dimensions of the stacked outputs of the image conductors (15), and of a rear-side block (55), adapted to the geometry of the receiving apparatus (16), and in that the front block (53) and the rear-side block (55) are connected through the intermediary of image conductors (15), the number of which corresponds to the number of image conductors (15) provided between the measuring modules (27) and the receiving apparatus (16).

7. Device according to claim 1, wherein the photosensitive receiving elements (38) are preceded by an optical system (33), said optical system (33) consisting of a first receiving lens system (34), a colour-beam divider (35) and a further receiving lens system (37) for each colour channel (X, Y, Z, NIR).

8. Device according to claim 7, wherein the optical system (33) contains two lens systems, said lens systems being so disposed that the intermediate space is transilluminated in virtually parallel manner.

9. Device according to claim 1, wherein the output of the image conductors (15) is succeeded by a field stop (62) with a plurality of gap-shaped openings (63).

10. Device according to claim 9, wherein the field stop (62) comprises a blacked-out region between the position of the image information and the position of a white reference of illumination apparatus (28).

11. Device according to claim 9, wherein the cross section of the image conductors (15) is greater than the field stop (62), and in that the input of each image conductor (15) is adjustable, with respect to the optical axis of the first lens system (34), in a holder at the receiving end of the image conductors (15).

12. Device according to claim 11, wherein the colour filters (36) in the optical system (33) consist of a plurality of different filter parts capable of being displaced in relation to the field stop (62).

13. Device according to claim 1, wherein the photosensitive receiving elements (38) each consist of a chip with a plurality of parallel parts, and in that the pixel height is greater than the height of the image of the scanning lines on the receiving elements (38).

14. Device according to claim 1, wherein the radiation from each of the individual illumination apparatuses (28), disposed in a line, is coupled onto a light guide (64), the output of which is connected directly to the corresponding image conductor (15) and is measured in each of the colour channels, with the result that measured colour values are made available for each illumination apparatus (28), said measured colour values being normalized to the corresponding values of a standard light source (47).

15. Device according to claim 14, wherein the standard light source (47) is a calibration white.

16. Device according to claim 15, wherein the calibration white (47) is disposed on a separate carrier in the cylinder gap (65) of a cylinder (5, 10) transporting the printed product (32), with respect to which cylinder (5, 10) the measurement is being performed, or on the cylinder (5, 10) itself, preferably over the entire length of the cylinder (5, 10).

17. Device according to claim 1, wherein a lamp closed-loop control (61) is provided, said lamp closed-loop control (61) adjusting the current for the illumination apparatuses (28), disposed in modules (27), in such a manner that the radiation intensity of said illumination apparatuses (28) is mutually balanced.

18. Device according to claim 17, wherein a light guide (64) is disposed in a hole (70), the axis of said light guide (64) being directed at the respective illumination apparatus (28), and in that the light guide (64) is axially displaceable inside said hole (70).

19. Device according to claim 1, wherein the measuring modules (27) are associated with blast-air apparatuses (45), said blast-air apparatuses (45) are disposed in a protective housing (46), the blast-air stream directed at the printed product (32) serving simultaneously to cool the illumination apparatuses (28) of the measuring modules (27).

20. Device according to claim 1, wherein a measuring bar (14) is swivellably held together with the illumination arrangement (28) and further parts (30) of the image-capturing apparatus and is lockable in a measuring position and in a parked position.

21. Device according to claim 20, wherein the measuring bar (14) is lockable in two positions with respect to a protective housing (46), and in that the measuring bar (14), at least when in the parked position, is disposed in the protective housing (46).

22. Device according to claim 21, wherein calibration white (47) is disposed in the protective housing (46) over preferably the entire length of the measuring bar (14), and in that normalization to the calibration white (47) can be carried out with the measuring bar (14) in the parked position.

23. Device according to claim 1, wherein the illumination arrangement (28) directly or indirectly emits radiation into the defined image region (50), and in that the reflected radiation is imaged via an optical system (33) onto receiving apparatuses (16).

24. Device according to claim 23, wherein the optical system (33) contains a beam divider (35), the individual outputs of which are associated with optical filters (36) with imaging optics (37).

25. Device according to claim 23, wherein the optical system (33) contains colour filters (36) and imaging optics (37) situated outside the perpendicular observation direction with respect to the illumination/measurement plane.

26. Device according to claim 23, wherein the optical system (33) contains a partial filter (66) disposed at the common focal point of two lens systems.

* * * * *